United States Patent
Gallagher et al.

(10) Patent No.: US 10,344,687 B2
(45) Date of Patent: *Jul. 9, 2019

(54) FUEL SELECTION METHOD AND RELATED SYSTEM FOR A MOBILE ASSET

(71) Applicant: General Electric Company, Schenectady, NY (US)

(72) Inventors: Shawn Gallagher, Lawrence Park, PA (US); Daniel George Norton, Niskayuna, NY (US)

(73) Assignee: GE Global Sourcing LLC, Norwalk, CT (US)

(*) Notice: Subject to any disclaimer, the term of this patent is extended or adjusted under 35 U.S.C. 154(b) by 463 days.

This patent is subject to a terminal disclaimer.

(21) Appl. No.: 14/847,899

(22) Filed: Sep. 8, 2015

(65) Prior Publication Data

US 2015/0377153 A1 Dec. 31, 2015

Related U.S. Application Data

(63) Continuation-in-part of application No. 13/551,748, filed on Jul. 18, 2012, now Pat. No. 9,157,385, which
(Continued)

(51) Int. Cl.
*F02D 19/08* (2006.01)
*F02D 19/06* (2006.01)
(Continued)

(52) U.S. Cl.
CPC ............ *F02D 19/081* (2013.01); *B61C 17/12* (2013.01); *F02D 19/0618* (2013.01);
(Continued)

(58) Field of Classification Search
CPC ............ F02D 41/0025; F02D 19/0647; F02D 19/081; F02D 41/0027; F02D 19/0618; F02D 2200/701; F02D 41/021
See application file for complete search history.

(56) References Cited

U.S. PATENT DOCUMENTS 4,402,212 A   9/1983   Childs
4,495,930 A   1/1985   Nakajima
(Continued)

FOREIGN PATENT DOCUMENTS

CN   101201020 A   6/2008
CN   102400797 A   4/2012
(Continued)

OTHER PUBLICATIONS

Mellde et al., "Advanced Automobile Engines for Fuel Economy, Low Emissions, and Multifuel Capability", Annual Review of Energy, vol. No. 14, pp. 425-444, Jan. 1, 1989.
(Continued)

*Primary Examiner* — Redhwan K Mawari
(74) *Attorney, Agent, or Firm* — McCoy Russell LLP

(57) ABSTRACT

Embodiments of methods and systems related to operating a mobile asset are provided. In one example, a method for operating a mobile asset includes supplying an engine with a fuel controller a first amount of a first fuel and a second amount of a second fuel and combusting the first fuel and the second fuel at a fuel combustion ratio in at least one cylinder of the engine, the first amount and the second amount being selected based on route information for a route along which the mobile asset is operable to travel and a projected exhaustion of the first fuel that does not precede a projected exhaustion of the second fuel, wherein the mobile asset is unable to operate with the second fuel alone.

9 Claims, 7 Drawing Sheets

Related U.S. Application Data is a continuation-in-part of application No. 13/328,438, filed on Dec. 16, 2011, now Pat. No. 8,682,512.

(51) Int. Cl.

| | | |
|---|---|---|
| *F02D 41/00* | (2006.01) | |
| *B61C 17/12* | (2006.01) | |
| *F02D 41/02* | (2006.01) | |
| *F02D 25/00* | (2006.01) | |
| *F02D 29/02* | (2006.01) | |
| *F02D 41/14* | (2006.01) | |
| *F02B 29/04* | (2006.01) | |
| *F02D 41/26* | (2006.01) | |

(52) U.S. Cl.
CPC ......... *F02D 19/0647* (2013.01); *F02D 25/00* (2013.01); *F02D 29/02* (2013.01); *F02D 41/0025* (2013.01); *F02D 41/0027* (2013.01); *F02D 41/021* (2013.01); *B60W 2550/143* (2013.01); *B60W 2550/402* (2013.01); *B60W 2560/06* (2013.01); *F02B 29/0425* (2013.01); *F02B 29/0437* (2013.01); *F02D 41/1444* (2013.01); *F02D 41/266* (2013.01); *F02D 2200/701* (2013.01); *F02D 2250/36* (2013.01); *Y02T 10/36* (2013.01); *Y02T 30/10* (2013.01)

(56) References Cited

U.S. PATENT DOCUMENTS

| | | | |
|---|---|---|---|
| 5,560,326 A | 10/1996 | Merritt | |
| 5,713,328 A | 2/1998 | Anderson et al. | |
| 5,875,743 A | 3/1999 | Dickey | |
| 5,890,459 A | 4/1999 | Hedrick et al. | |
| 5,911,210 A | 6/1999 | Flach | |
| 6,101,986 A | 8/2000 | Brown et al. | |
| 6,276,334 B1 | 8/2001 | Flynn et al. | |
| 6,543,395 B2 | 4/2003 | Green | |
| 6,907,870 B2 | 6/2005 | Zur Loye et al. | |
| 6,912,992 B2 | 7/2005 | Ancimer et al. | |
| 6,951,202 B2 | 10/2005 | Oda | |
| 7,019,626 B1* | 3/2006 | Funk ................ | F02D 19/0647 123/205 |
| 7,044,103 B2 | 5/2006 | May | |
| 7,107,942 B2 | 9/2006 | Weissman et al. | |
| 7,387,091 B2 | 6/2008 | Ritter | |
| 7,503,312 B2 | 3/2009 | Surnilla et al. | |
| 7,509,209 B2* | 3/2009 | Davis ................ | F02D 19/027 123/689 |
| 7,533,634 B2 | 5/2009 | Ritter et al. | |
| 7,549,408 B2 | 6/2009 | Russell | |
| 7,556,030 B2 | 7/2009 | Ashida et al. | |
| 7,640,913 B2 | 1/2010 | Blumberg et al. | |
| 7,740,000 B2 | 6/2010 | He et al. | |
| 7,861,518 B2* | 1/2011 | Federle ................ | F01N 3/208 60/274 |
| 7,913,664 B2* | 3/2011 | Williams ............ | F02D 19/0628 123/304 |
| 7,983,831 B2 | 7/2011 | Tsunooka | |
| 8,006,677 B2 | 8/2011 | Williams et al. | |
| 8,032,294 B2 | 10/2011 | Loeffler et al. | |
| 8,037,850 B2 | 10/2011 | Pursifull | |
| 8,402,939 B2 | 3/2013 | Reuss et al. | |
| 8,555,702 B2 | 10/2013 | Sgatti et al. | |
| 8,584,657 B2 | 11/2013 | Yagi et al. | |
| 8,733,298 B2 | 5/2014 | Haskara et al. | |
| 8,893,691 B2 | 11/2014 | Payne et al. | |
| 9,334,841 B1 | 5/2016 | Jackson et al. | |
| 2003/0037978 A1* | 2/2003 | Hofbauer ................ | B60K 6/48 180/65.25 |
| 2003/0221661 A1 | 12/2003 | Willi et al. | |
| 2003/0226349 A1 | 12/2003 | Klenk et al. | |
| 2004/0182378 A1 | 9/2004 | Oshimi et al. | |
| 2006/0102145 A1 | 5/2006 | Cohn et al. | |
| 2007/0079647 A1 | 4/2007 | Aoyama | |
| 2007/0095331 A1* | 5/2007 | Ayame ................ | F02D 41/0025 123/491 |
| 2007/0119425 A1 | 5/2007 | Lewis et al. | |
| 2007/0137514 A1* | 6/2007 | Kumar .................... | B61C 3/006 105/26.05 |
| 2008/0053399 A1 | 3/2008 | Bromberg et al. | |
| 2008/0098726 A1 | 5/2008 | Donaldson et al. | |
| 2008/0110161 A1* | 5/2008 | Persson .................. | F01N 13/10 60/312 |
| 2008/0121136 A1* | 5/2008 | Mari ...................... | B60L 11/02 105/35 |
| 2008/0262701 A1 | 10/2008 | Williams et al. | |
| 2009/0025695 A1 | 1/2009 | Wolber et al. | |
| 2009/0271090 A1 | 10/2009 | Surnilla et al. | |
| 2009/0292444 A1 | 11/2009 | Russell | |
| 2010/0162678 A1* | 7/2010 | Annigeri ................. | F02C 3/22 60/39.281 |
| 2011/0015856 A1 | 1/2011 | Arnold | |
| 2011/0079197 A1 | 4/2011 | Stewart et al. | |
| 2011/0088654 A1 | 4/2011 | Courtoy et al. | |
| 2011/0114058 A1 | 5/2011 | Cohn et al. | |
| 2011/0118914 A1* | 5/2011 | Brooks ................... | B61L 3/006 701/20 |
| 2011/0132323 A1 | 6/2011 | Surnilla et al. | |
| 2011/0137470 A1* | 6/2011 | Surnilla ................ | G01C 21/26 700/282 |
| 2011/0184629 A1 | 7/2011 | Krengel et al. | |
| 2011/0209459 A1 | 9/2011 | Hancu et al. | |
| 2011/0288738 A1 | 11/2011 | Donnelly et al. | |
| 2011/0288744 A1 | 11/2011 | Gokhale et al. | |
| 2011/0288751 A1 | 11/2011 | Kurtz | |
| 2012/0109496 A1 | 5/2012 | Hylands et al. | |
| 2012/0145122 A1 | 6/2012 | Kurtz et al. | |
| 2012/0158269 A1 | 6/2012 | Nakayama | |
| 2012/0272935 A1 | 11/2012 | Magnusson | |
| 2012/0325180 A1 | 12/2012 | Montgomery | |
| 2012/0325350 A1 | 12/2012 | Kim et al. | |
| 2013/0025573 A1 | 1/2013 | Klingbeil et al. | |
| 2013/0158752 A1* | 6/2013 | Norton .................. | F02D 41/021 701/19 |
| 2013/0158848 A1* | 6/2013 | Gallagher ............. | F02D 41/021 701/123 |
| 2014/0069384 A1 | 3/2014 | Suzuki et al. | |
| 2014/0261345 A1 | 9/2014 | Bromberg et al. | |

FOREIGN PATENT DOCUMENTS

| | | |
|---|---|---|
| DE | 19922748 A1 | 11/2000 |
| DE | 10146789 A1 | 4/2003 |
| DE | 10211122 A1 | 9/2003 |
| DE | 102004051287 A1 | 4/2006 |
| DE | 102005016006 A1 | 10/2006 |
| DE | 102006020223 B3 | 8/2007 |
| DE | 102010036131 A1 | 3/2012 |
| EP | 2336529 A2 | 6/2011 |
| JP | 2000145488 A | 5/2000 |
| JP | 2004108153 A | 4/2004 |
| JP | 2008274954 A | 11/2008 |
| JP | 2010065604 A | 3/2010 |
| RU | 2136918 C1 | 9/1999 |
| WO | 9421911 A1 | 9/1994 |
| WO | 03076788 A1 | 9/2003 |
| WO | 2007092711 A2 | 8/2007 |
| WO | 2011128692 A1 | 10/2011 |
| WO | 2011153069 A1 | 12/2011 |

OTHER PUBLICATIONS

Kessels et al., "Integrated Energy & Emission Management for Hybrid Electric Truck with SCR Aftertreatment", IEEE Vehicle Power and Propulsion Conference (VPPC), Lille, pp. 1-6, 2010.

PCT Search Report and Written Opinion issued in connection with corresponding PCT Application No. PCT/US2012/064929 dated Mar. 6, 2013.

(56) References Cited

OTHER PUBLICATIONS

PCT Search Report and Written Opinion issued in connection with corresponding PCT Application No. PCT/US2013/047501 dated Nov. 6, 2013.
Daniel George Norton, filed Apr. 14, 2014, U.S. Appl. No. 14/251,726.
Shawn Gallagher et al., filed Jul. 18, 2012, U.S. Appl. No. 13/551,748.
Qian et al., "Research of the Influence of Combustion Chamber Structure on Performance of Dual Fuel Engine", IEEE International Conference on Electric Information and Control Engineering (ICEICE), 3 pages, Apr. 15-17, 2011.
Eurasian Search Report issued in connection with related EA Application No. 201300516 dated Oct. 3, 2013.
Great Britain Combined Search and Examination Report issued in connection with related GB Application No. GB1309361.2 dated Nov. 25, 2013.
Great Britain Office Action issued in connection with related GB Application No. 1309361.2 dated Jun. 9, 2015.
U.S. Non-Final Rejection issued in connection with related U.S. Appl. No. 13/484,621 dated Oct. 6, 2015.
Australian Office Action issued in connection with related AU Application No. 2013205863 dated May 13, 2016.
Chinese Office Action issued in connection with related CN Application No. 201310211815.X dated Jun. 29, 2016.

\* cited by examiner

FUEL SELECTION METHOD AND RELATED SYSTEM FOR A MOBILE ASSET

CROSS-REFERENCE TO RELATED APPLICATIONS

This application is a continuation-in-part of U.S. patent application Ser. No. 13/551,748, filed Jul. 18, 2012, which is a continuation-in-part of U.S. patent application Ser. No. 13/328,438, filed Dec. 16, 2011, now U.S. Pat. No. 8,682,512 issued Mar. 25, 2014, the entirety of each of which are hereby incorporated by reference for all purposes.

BACKGROUND

The invention relates generally to mobile assets, and more specifically to a fuel optimizing system for engines using more than one fuel.

Generally, mobile assets having engines, for example, compression-ignition engines, operate by directly injecting a fuel (e.g., diesel fuel) into compressed air in one or more piston-cylinder assemblies, such that the heat of the compressed air ignites the fuel-air mixture. The direct fuel injection atomizes the fuel into droplets, which evaporate and mix with the compressed air in the combustion chambers of the piston-cylinder assemblies. The fuel-air ratio affects engine performance, efficiency, exhaust pollutants, and other engine characteristics. Exhaust emissions generally include pollutants such as carbon oxides (e.g., carbon monoxide), nitrogen oxides (NOx), sulfur oxides (SOx), and particulate matter (PM). The amount and relative proportion of these pollutants varies according to the fuel-air mixture, compression ratio, injection timing, environmental conditions (e.g., atmospheric pressure, temperature), and so forth.

A dual-fuel engine is an alternative internal combustion engine designed to run on more than one fuel, for example, natural gas and diesel, each stored in separate vessels. Such engines are capable of burning a mixture of the resulting blend of fuels in the combustion chamber and the fuel injection or spark timing may be adjusted according to the blend of fuels in the combustion chamber. For dual fuel operation where one of the fuel is premixed with air, a reduction in nitrogen oxide (NOx) and particulate matter (PM) emissions is enabled by combusting a relatively larger fraction of the premixed fuel.

Relative costs and availability of different fuels are constantly in flux. Proportions of different fuels may also have an effect on the exhaust pollutants from the engine.

There is a need for an improved system and method for engines operating on more than one fuel so as to optimize fuel usage while meeting emission standards.

BRIEF DESCRIPTION

In accordance with one exemplary embodiment of the present invention, a method for operating a mobile asset utilizing a plurality of fuels is disclosed. The method includes supplying an engine with a fuel controller a first amount of a first fuel and a second amount of a second fuel and combusting the first fuel and the second fuel at a fuel combustion ratio in at least one cylinder of the engine, the first amount and the second amount being selected based on route information for a route along which the mobile asset is operable to travel and a projected exhaustion of the first fuel that does not precede a projected exhaustion of the second fuel, wherein the mobile asset is unable to operate with the second fuel alone.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
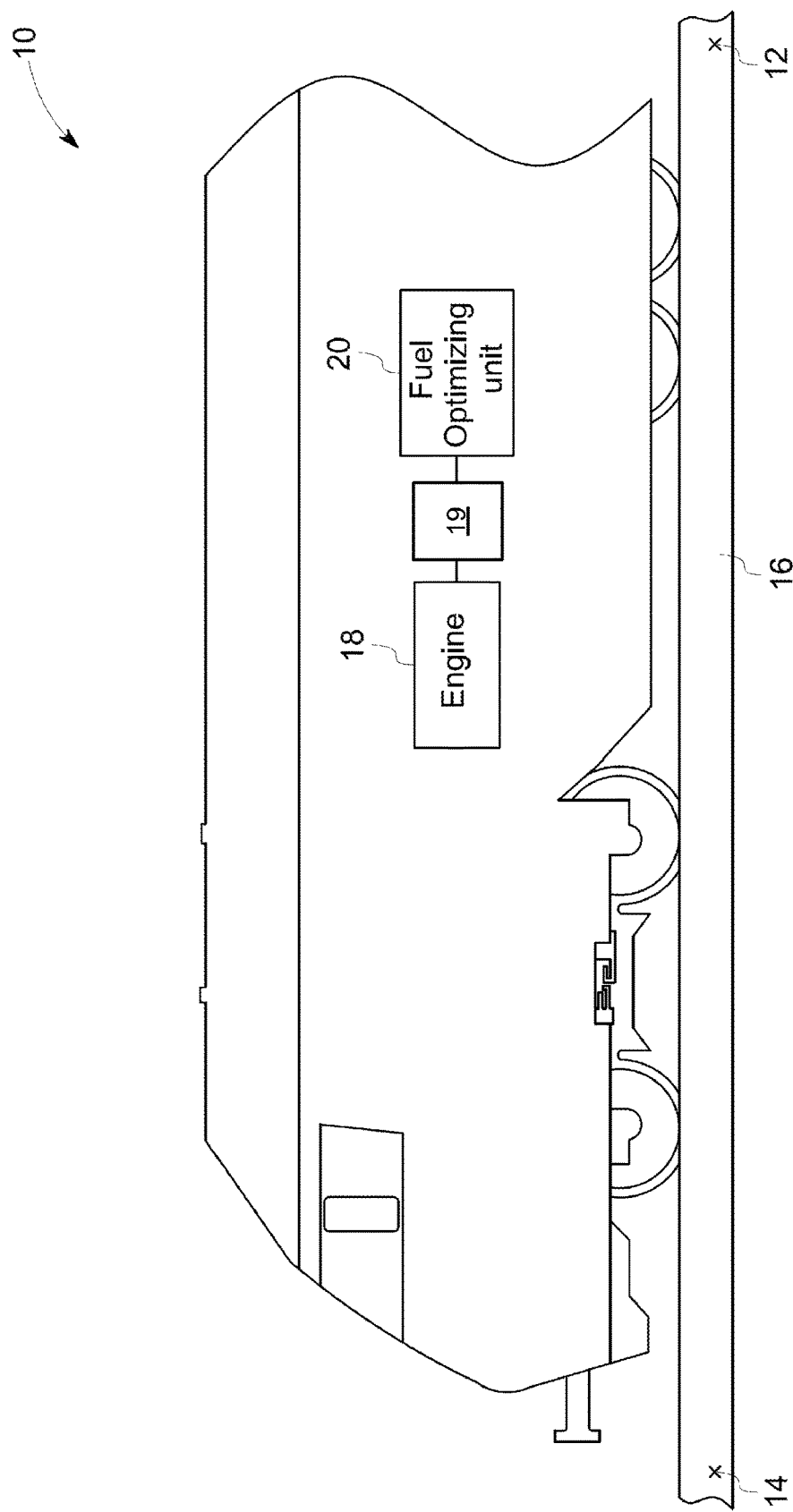
FIG. 1 is a diagrammatical representation of a mobile asset, for example a locomotive, having a fuel optimizing unit in accordance with an embodiment of the present invention.

In accordance with the embodiments discussed herein, a method for operating a mobile asset utilizing a plurality of fuels is disclosed. The method includes determining a plurality of characteristic profiles associated with a mobile asset moving from a first operating point to a second operating point along a predefined path. The method further includes determining a fuel combustion ratio of the plurality of the fuels associated with at least one engine cylinder of the mobile asset based on the plurality of characteristic profiles so as to maintain a plurality of actual values associated with usage of the plurality of fuels to less than or equal to predefined corresponding threshold values. The fuel combustion ratio is a ratio of the plurality of fuels to be delivered to the at least one engine cylinder. For example, in an embodiment where two fuels may be delivered to an engine cylinder, the fuel combustion ratio may represent a ratio of an amount of the first fuel supplied to an amount of the second fuel supplied, or an amount of the first fuel supplied to a total fuel amount supplied, or any suitable ratio of the two fuels. It will be appreciated that the fuel combustion ratio may be extended to embodiments where more than two fuels are combusted in a cylinder. In such embodiments, one or more fuel combustion ratios may be determined. For example, in an embodiment where three fuels may be combusted in a cylinder, a plurality of fuel combustion ratios including a ratio of an amount of the first fuel to an amount of the second fuel, an amount of the first fuel to an amount of the third fuel, an amount of the second fuel to an amount of the third fuel, or any other suitable ratio(s) may be determined. The method also includes controlling a fuel delivery system of the mobile asset so as to deliver the plurality of fuels to the at least one engine cylinder based on the fuel combustion ratio. In accordance with some embodiments, a related system is disclosed.

Some mobile assets configured to combust a plurality of fuels may be configured to run on just one of the plurality of fuels. For example, a mobile asset configured to combust diesel fuel and natural gas may optionally be equipped to operate on diesel fuel alone. However, in some settings, a mobile asset configured to combust two or more fuels may not be equipped to operate using a single fuel source. For example, some mobile assets configured to burn diesel and natural gas may lack emissions aftertreatment devices configured to treat combustion of diesel fuel alone, or may not be configured to burn natural gas alone. Consequently, it can be difficult to determine when/where to refuel the mobile asset so that the mobile asset does not run out of one or more of the plurality of fuels at which point the mobile asset becomes inoperative. Further, there may be differences in relative costs and availability of different fuels among various fuel stations located along a predefined path over which a mobile asset may travel that may affect selection of a fuel combustion ratio.

Accordingly, some of the embodiments disclosed herein are related to methods of operating a mobile asset. For example, one embodiment of a method includes supplying an engine with a first amount of a first fuel and a second amount of a second fuel, the first amount and the second amount being selected based on route information for a fixed route along which the mobile asset is operable to travel and fuel market information, and thereby to achieve a projected exhaustion of the first fuel that does not precede a projected exhaustion of the second fuel. As used herein, route information refers to any suitable information that may be used to plan how to operate a mobile asset during a trip over the predefined path. Fuel market information refers to any suitable information that may be related to the commercial market for one or more fuels combustible in the mobile asset, including fuel price and availability information. Thus, the amount of the first and second fuels selected for supply to the cylinder may vary according to the route information and the fuel market information so that the mobile asset does not become inoperative due to exhaustion of one or more of the fuels. In some embodiments, an acceptable exhaustion tolerance may be 1% of the fuel volume, so that a projected exhaustion of a first fuel that exceeds a projected exhaustion of a second fuel by more than 1% of the second fuel causes the mobile asset to become inoperative, while a projected exhaustion of the first fuel that exceeds a projected exhaustion of the second fuel by less than 1% does not affect operation of the mobile asset. In accordance with some embodiments, engine systems are also disclosed. One example engine system includes a fuel controller capable of adjusting an amount of at least one of a first fuel of a plurality of fuels delivered to an engine and a second fuel of the plurality of fuels responsive to at least one of fuel market information for the plurality of fuels and route information about a fixed route along which a mobile asset powered by the engine is operable to travel.

In some embodiments, a plurality of mobile assets included in a consist of mobile assets may be operated in view of a fuel combustion ratio established for at least one of the mobile assets in the consist. Accordingly, some of the embodiments disclosed herein are related to methods for operating a consist. One example method includes receiving route information for a fixed route along which the consist is traveling or will travel and receiving fuel market information for a first fuel and a second fuel, the first fuel and the second fuel being combustible in an engine in a first mobile asset of the consist. The example method also includes generating a motive power setting based upon the route information and the fuel market information so that a projected exhaustion of the first fuel does not precede a projected exhaustion of the second fuel.

Some mobile assets configured to combust varying proportions of different fuels may exhibit varying identities and concentrations of combustion products (e.g., exhaust emissions) according to the proportion of the fuels supplied to the engine. Some of these emission products and concentrations may be regulated at different levels in different jurisdictions through which the mobile asset may travel during a journey along a predefined path. Further, some of the emission products and concentrations may vary as a function of the predefined path.

Accordingly, some of the embodiments disclosed herein are related to an engine system. One example engine system includes a fuel controller configured to adjust a first amount of at least one of a first fuel of a plurality of fuels delivered to an engine and a second amount of a second fuel of the plurality of fuels responsive to at least one of fuel market information for the plurality of fuels or route information about a fixed route along which a mobile asset powered by the engine is operable to travel. In some examples, t fuel controller may be further configured to adjust an amount of at least one of the first and second fuels delivered to an exhaust fluidly coupled to the engine so that an actual emission level associated with usage of the plurality of fuels is less than or equal to a predefined emission level included in projected emission information associated with the fixed route. Another example engine system includes an engine including a cylinder and an exhaust fluidly coupled to the cylinder and a fuel controller including memory holding instructions executable by a processor to deliver an amount of one or more of a plurality of fuels to the exhaust, for emissions control of the mobile asset and adjust the amount of the one or more of the plurality of fuels delivered to the exhaust responsive to at least one of fuel market information along a predefined path along which the mobile asset is operative to travel or route information about the predefined path.

Referring to FIG. 1, a mobile asset 10 moving from a first operating point 12 to a second operating point 14 along a predefined path 16 is disclosed. As used herein, a predefined path may refer to any suitable fixed/determined route along which the mobile asset is operable to travel. For example, in some embodiments, a fixed route may include one or more railway main lines or spurs joining two or more operating points. Predefined path and fixed route also include a particular course that a mobile asset travels upon, or will travel upon, that is selected from among plural possible, different courses for the mobile asset. Further, the term "profiles" is used herein to describe the overall operating parameters and conditions of the mobile asset 10. Put another way, a characteristic profile for the mobile asset 10 includes all of the mobile asset operation information that describes how the mobile asset 10 is/has actually operated. Actual values refer to values generated through a suitable sensing and/or measuring process or a value derived from sensed or measured information. Non-limiting examples of mobile asset operation information that may be included within a characteristic profile for the mobile asset 10 includes one or more of a quantity of one or more of the plurality of fuels present in respective mobile asset fuel sources, actual fuel usage information, actual engine speed information, actual engine load information, actual engine emission information, and actual mobile asset location information. These profiles may alter the manner in which the operating systems of the mobile asset 10 can be controlled in response to operational inputs. In the illustrated embodiment, the mobile asset 10 is a locomotive. In other embodiments, the mobile asset 10 can be a vehicle or other engine powered assembly. Suitable vehicles include passenger and non-passenger vehicles, hybrid vehicles, off-highway vehicles, on-road vehicles (such as tractor trailers), tracked vehicles, air-borne vehicles, rail vehicles, and marine vessels. A mobile asset's configuration may include performance variables such as the peak output power rating of the mobile asset 10, the correlation between the power level settings and the percentage of full power generated, engine emissions curves, acoustic emissions, electro-magnetic emissions, the number of traction motors used, fuel economy performance, adhesion limits, the organization, presentation and functionality of operator controls, communications protocol, auxiliary functions, security measures, and the like. External factors that can affect the mobile asset's desired configuration can include tax liabilities for operation, weather considerations, damage risk (due to crime or conflict), proximity to population centers, and the like.

In the illustrated embodiment, the mobile asset 10 is driven by an engine 18 utilizing a plurality of fuels. In the exemplary engine 18, a reduction in nitrogen oxide (NOx) and particulate matter (PM) emissions is enabled by combusting a relatively larger fraction of the premixed fuel. However, relative costs and availability of different fuels are constantly in flux. For example, in some embodiments, diesel and natural gas may be utilized to drive the engine 18. If the cost of diesel increases relative to the cost of the natural gas, more natural gas may be used resulting in reduced cost and emissions. If the cost of natural gas is increased relative to the cost of the diesel, then more diesel may be used to drive the engine 18. It should be noted herein that in certain embodiments, the mobile asset 10 may utilize other fuels instead of diesel, natural gas. The optimization of fuel usage is also dependent on various characteristic profiles associated with the mobile asset 10 and may vary as a function of time and a corresponding location of the asset 10 along the path 16. In accordance with the embodiments of the present invention, a fuel optimizing unit 20 is used to optimize fuel utilization based on cost and availability while ensuring emission compliance along the travel from the first operating point 12 to the second operating point 14 along the predefined path 16. The fuel optimizing unit 20 is explained in greater detail below with reference to subsequent figures.

The illustrated engine 18 and the fuel optimizing unit 20 communicate with an engine controller 19. The engine controller 19 may control any suitable aspect of the engine 18. For example, in some embodiments the engine controller 19 may control an engine speed of the engine 18 by generating an engine speed setting. The engine controller 19 may exchange information with the fuel optimizing unit 20 to manage operation of the engine 18. Further, in some embodiments the engine controller 19 may control other aspects of the engine 18, including various turbo-chargers, emission control equipment, heat exchangers, and the like as described in more detail below. It will be appreciated that the functions performed by the fuel optimizing unit 20 and the engine controller 19 may be arranged in any suitable fashion. In some embodiments, aspects of the fuel optimizing unit 20 may be distributed among various controllers included within the mobile asset 10, including the engine controller 19. For example, one or more algorithms or sections of code for the fuel optimizing unit 20 may be included within the engine controller 19. In some other embodiments, the fuel optimizing unit 20 may be integrated within the engine controller 19. In still other embodiments, the fuel optimizing unit 20 may be a standalone unit separated from the engine controller 19.

Figure 2:
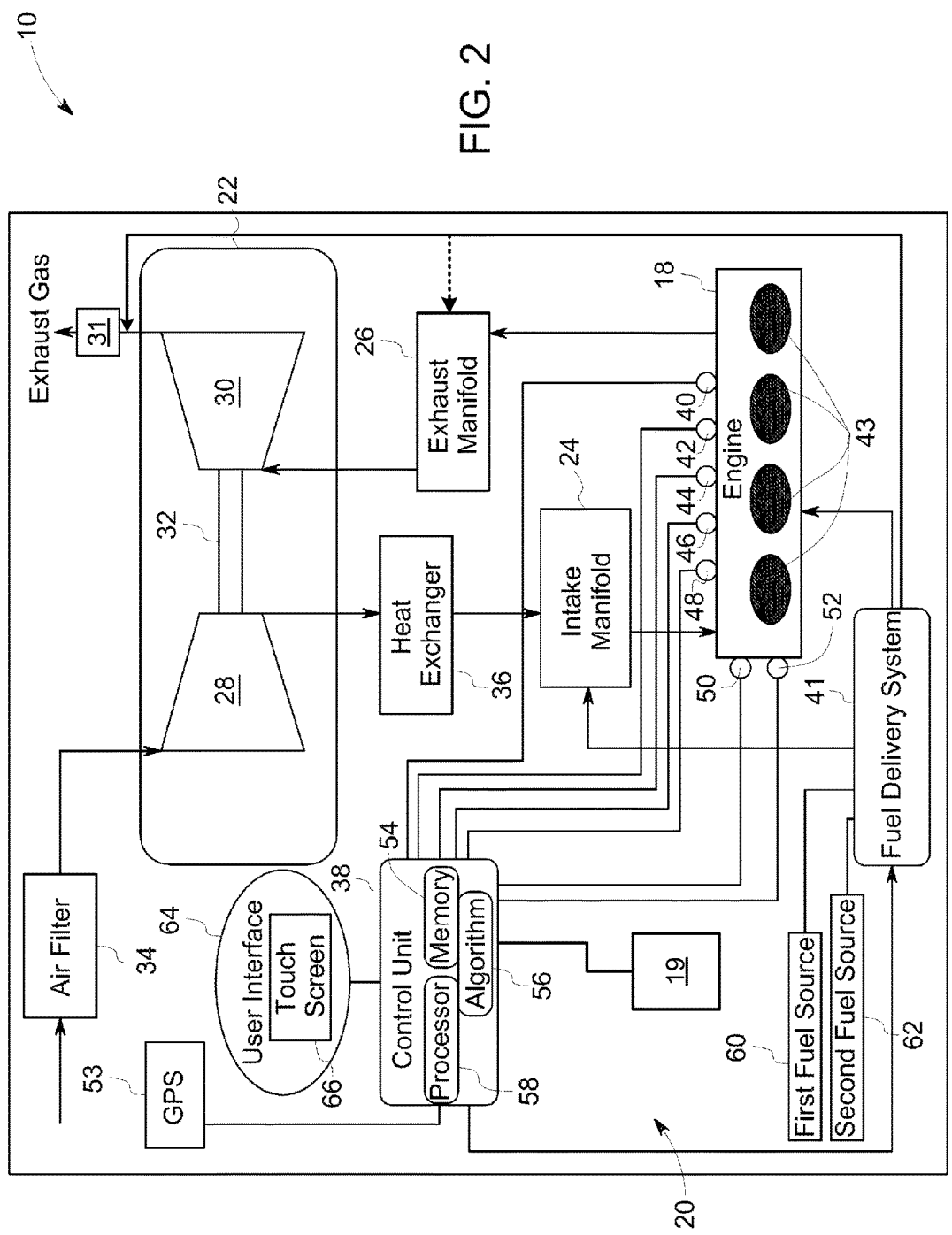
FIG. 2 is a diagrammatical representation of a mobile asset with detailed view of a fuel optimizing unit in accordance with an embodiment of the present invention.

Referring to FIG. 2, the mobile asset 10 having fuel optimization features is illustrated in accordance with certain embodiments of the present technique. The mobile asset 10 includes a turbo-charger 22 and the compression-ignition engine, e.g., the diesel engine 18. A motor-generator unit (not shown) may be mechanically coupled to the turbo-charger 22. As discussed in further detail below, embodiments of the present technique provide monitoring and control features, such as sensors and control logic, to optimize utilization of fuel.

The illustrated engine 18 includes an air intake manifold 24 and an exhaust manifold 26. The turbo-charger 22 includes a compressor 28 and a turbine 30 and is operated to supply compressed air to the intake manifold 24 for combustion within the engine 18. The turbine 30 is coupled to the exhaust manifold 26 for extracting energy from exhaust gases for rotating a turbocharger shaft 32 connected to the compressor 28. The compressor 28 draws ambient air through a filter 34 and provides compressed air to a heat exchanger 36. The temperature of air is increased due to compression. The compressed air flows through the heat exchanger 36 such that the temperature of air is reduced prior to delivery into the intake manifold 24 of the engine 18. In one embodiment, the heat exchanger 36 is an air-to-water heat exchanger, which utilizes a coolant to facilitate removal of heat from the compressed air. In another embodiment, the heat exchanger 36 is an air-to-air heat exchanger, which utilizes ambient air to facilitate removal of heat from compressed air. It should be noted herein that the illustrated configuration of engine 18 and associated components, is an exemplary embodiment and should not in any way be construed as limiting the scope. In other words, the exemplary fuel optimizing unit 20 may be used for any type of engines or other mobile assets utilizing a plurality of fuels so as to optimize fuel utilization based on cost and availability while ensuring emission compliance during travel.

In some embodiments, exhaust gases exiting a lower pressure side of turbine 30 (e.g., exhaust gases expelled from the turbine after expansion) may be processed by an exhaust gas aftertreatment system 31 operative to treat the exhausted gases prior to emission from the mobile asset 10. Such treatment may include one or more aftertreatment devices configured to process the gases so that one or more exhaust species within the exhaust gases are managed to predetermined exhaust emission levels. Any suitable aftertreatment device may be included within the exhaust gas aftertreatment system 31. Non-limiting examples include various catalysts, adsorbents, and afterburners operative to manage the concentration of hydrocarbon, COx, and/or NOx species present in the exhaust gases. In one scenario, a selective catalytic reduction device and an associated reductant supply may be included within the exhaust gas aftertreatment system 31. In another scenario, a suitable soot management device may be included within the exhaust gas aftertreatment system 31.

In some embodiments where an exhaust gas aftertreatment system 31 is provided, a suitable fuel may be supplied upstream and/or within the exhaust gas aftertreatment system 31. In some embodiments, supplying a suitable fuel within the exhaust gas stream may provide a predetermined concentration of hydrocarbon that maintains a temperature of a catalyst included within the exhaust gas aftertreatment system 31 within a preselected temperature range, within an acceptable tolerance. In some embodiments, supplying a suitable fuel to the exhaust may reduce concentrations of NOx in exhaust gases. For example, in hydrocarbon selective catalytic reduction (HC-SCR), diesel fuel may be supplied at or upstream of an aftertreatment catalyst to reduce NOx emissions from diesel exhaust gases.

Regardless of how the exhaust gases are to be treated, it will be appreciated that diesel fuel may be provided at any suitable position within the exhaust. For example, in some embodiments, diesel fuel may be supplied to the exhaust gas aftertreatment system 31. Additionally or alternatively, in some embodiments diesel fuel may be supplied at the exhaust manifold 26. Additionally or alternatively, in some embodiments fuel may be supplied to a cylinder 43 of engine 18 after a piston slidably disposed in that cylinder 43 passes through top dead center during a power stroke phase of an engine cycle (e.g., a post-injection of fuel). In such examples, that cylinder 43 will be provided with two or more fuel supply events, a first supply event occurring during an injection phase of the engine cycle and one or more supply events occurring after the injection phase.

The fuel optimizing unit 20 includes a control unit 38, and a plurality of sensors including but not limited to an engine emission level sensor 40, a fuel usage level sensor 42, a power output sensor 44, an engine load sensor 46, an engine speed sensor 48, fuel cost meter 50, and a fuel injection profile sensor 52. The fuel optimizing unit 20 may also include a global positioning sensor (GPS) 53. In the illustrated embodiment, the control unit 38 is an electronic fuel injection control unit for the engine 18. In another embodiment, the control unit 38 is an electronic logic control unit that is programmable by a user. The control unit 38 may be operable to produce a signal to control operation of a fuel delivery system 41 having a plurality of fuel injection pumps (not shown) for driving a plurality of plurality of fuel injectors (not shown) for injecting fuel into a plurality of cylinders 43 of the engine 18. A piston (not shown) is slidably disposed in each cylinder 43 and reciprocates between a top dead center and a bottom dead center position. The control unit 38 may receive an engine emission level signal from the level sensor 40, a fuel usage level signal from the sensor 42, a power output signal from the power sensor 44, an engine load signal from the load sensor 46, an engine speed signal from the speed sensor 48, fuel cost from the meter 50, and a fuel injection profile signal from the injection sensor 52. While the fuel optimization unit 20 and the control unit 38 are depicted as being included within the mobile asset 10 (e.g., on-board units) in the embodiment shown in FIG. 2, it will be appreciated that, in some embodiments, either or both units may be located off of the mobile asset 10. In one scenario, an off-board fuel optimization unit 20 located at a dispatching facility may receive sensed information from one or more mobile assets and, in turn, generate engine settings, fuel combustion ratios, refueling plans, etc., for transmission the mobile assets.

The control unit 38 may receive any suitable route information related to the predefined path 16. For example, route information may include geographical information about the path 16, including distance information from the first operating point 12 to the second operating point 14, terrain profile information for the path, location and identity information for one or more fuel stations along the predefined path 16. Route information may also include weather information at one or more locations along the predefined path 16. Route information may also include projections about a trip over predefined path 16. For example, route information may include a projected time to travel over the predefined path 16. Moreover, some of such projections may be functionally related to other trip-related variables. For example, route information may include projected mobile asset location information, projected engine speed information, projected engine load information, projected engine emission information, etc., as a function of time, location, or other suitable parameter during the journey. Such route information may be received at any suitable time by the control unit 38. For example, the route information may be received before or at the beginning of a journey, and may optionally be updated at any suitable time, and/or at any suitable update interval during the journey. Thus, in some examples, the control unit 38 may also receive one or more signals associated with at least one of a distance from the first operating point to the second operating point along the predefined path, terrain profile associated with the path, ambient temperature and pressure, time required to traverse the distance, and location of one or more fuel stations along the predefined path from the GPS 53.

The control unit 38 may also receive any suitable fuel market information for one or more fuels combustible in the engine 18. In some embodiments, the fuel market information may include availability information and/or price information for one or more of the fuels. In some embodiments the fuel market information may reflect average market information (e.g., regional, national, or global average market information). Additionally or alternatively, in some embodiments the fuel market information may include local fuel market information for one or more fuel stations along a predefined path. For example, the fuel market information may include information about the amount and/or price of liquefied natural gas and/or diesel fuel available at one or more fuel stations along the path that the mobile asset will take during a journey. In this example, the fuel price and/or availability information for those locations may be used to create a plan including information about when/at what location one or more fuels is to be obtained, as described in more detail below. Moreover, in some embodiments, the control unit 38 may receive updated fuel market information during the journey or at any other suitable time. Updates may be received at any suitable update interval and may be provided according to a predefined update schedule and/or according to prompts for updates provided by the control unit 38 and/or an update server.

In the illustrated embodiment, the control unit 38 may further include a memory 54, an algorithm 56, and a processor 58. The memory 54 may be configured to store predefined information associated with the mobile asset 10. For example, the memory may store information relating but not limited to temperature, and pressure of the engine 18, fuel injection timing and pressure, engine speed, power output of the engine 18, engine emission level, fuel usage level, engine load, fuel cost, distance from the first operating point to the second operating point along the predefined path, terrain profile associated with the path, ambient temperature and pressure, time required to traverse the distance, and location of one or more fuel stations along the predefined path, or the like. Furthermore, the memory 54 may be configured to store actual sensed/detected information from the above-mentioned sensors. The algorithm 56 facilitates the processing of signals from the above-mentioned plurality of sensors. The characteristic profiles associated with the mobile asset 10 include the output from all the above-mentioned sensors discussed above and also the information stored in the memory 54.

The processor 58 may include a range of circuitry types, such as a microprocessor, a programmable logic controller, a logic module, etc. The processor 58 in combination with the algorithm 56 may be used to perform the various computational operations relating to determination of a combustion ratio of the plurality of fuels to be delivered to each cylinder 43 of the engine 18. It should be noted herein that the combustion ratio is the ratio of the plurality of fuels delivered to each cylinder 43 of the engine 18. For example, if the engine 18 is utilizing diesel and natural gas, then the combustion ratio would be ratio of diesel to natural gas to be delivered to each cylinder 43. In the illustrated embodiments, the mobile asset 10 has a first fuel source 60 and a second fuel source 62 for feeding a first fuel and a second fuel respectively, to the corresponding cylinders 43 of the engine 18. While the embodiment depicted in FIG. 2 illustrates the first fuel source 60 and the second fuel source 62 as being included within the mobile asset 10, it will be appreciated that one or more fuel sources may be supplied from fuel source partially or completely located off of the mobile asset 10. For example, in some embodiments, one or more fuels may be supplied from a tender car removably coupled to the mobile asset 10. In one scenario, liquefied natural gas (LNG) may be stored in a suitable tender car for subsequent vaporization/compression to compressed natural gas (CNG) and supply to the engine 18. In such a scenario, the fuel source may include one or more LNG and/or CNG supply sources positioned in a tender car, the mobile asset 10, or both. The first and second fuels may be injected to the cylinders 43 via the intake manifold 24 or may also be injected directly to the cylinders. It should be noted herein that in some embodiments, more than two fuels may also be used. Further, in some examples, non-combustible energy sources, such as electricity may also be used to propel the mobile asset, and/or hydrogen fuel may be used to propel the mobile asset.

The processor 58 is configured to determine the fuel combustion ratio of the plurality of the fuels associated with each engine cylinder 43 of the mobile asset 10 based on the plurality of characteristic profiles. In some embodiments, the processor 58 determines the combustion ratio based on the output from the sensors 40, 42, 44, 46, 48, 50 and 52. In certain other embodiments, the processor 58 determines the combustion ratio based on the output from the GPS 53. In a specific embodiment, the processor 58 utilizes information from the GPS 53 in conjunction with the information from the other sensors 40, 42, 44, 46, 48, 50 and 52 to determine the combustion ratio. Additionally, the processor 58 may also use the information stored in the memory 54. The processor 58 outputs a control signal to the fuel delivery system 41 so as to deliver the plurality of fuels to the cylinders 43 based on the combustion ratio. The combustion ratio is determined in such a way so to maintain a plurality of actual values associated with usage of the plurality of fuels to less than or equal to predefined corresponding threshold values. In one embodiment, an actual cost associated with usage of the plurality of fuels is maintained to less than or equal to a predefined threshold cost. In another embodiment, an actual emission level associated with usage of the plurality of fuels is maintained to less than or equal to a predefined threshold emission level. In yet another embodiment, an actual quantity of fuel in the mobile asset is maintained to less than or equal to a predefined threshold quantity. Overall, the fuel optimizing unit 20 is used to optimize fuel utilization based on cost and availability while ensuring emission compliance along the entire travel from the first operating point to the second operating point along the predefined path. For example, if two fuels are used, the optimizing unit 20 ensures maximum usage of a secondary fuel and adequate primary fuel exists to complete the travel, taking into consideration of the characteristics profiles.

As discussed previously, relative costs and availability of different fuels are constantly in flux. Also, proportions of different fuels may also have an effect on the exhaust pollutants from the engine 18. In one embodiment, the fuel optimizing unit 20 takes into consideration sensed engine emission level, a fuel usage level (i.e. quantity of fuel required for the travel, remaining quantity of fuel in the fuel sources 60, 62) the engine power output, the engine load, the engine speed, fuel cost, and the fuel injection profile. In some embodiments, the fuel optimizing unit 20 may take into consideration distance from the first operating point to the second operating point along the predefined path, terrain profile associated with the path, ambient temperature and pressure, time required to traverse the distance, and location of one or more fuel stations along the predefined path, or the like. Other suitable parameters are also envisaged. For example, in some embodiments the fuel optimizing unit 20 may take into consideration fuel market information. In some settings, the price and/or availability of one or more fuels at one or more fuel stations located along the predefined path may be considered, as may updates to those factors that may reflect changes in availability and/or cost.

It should be noted herein parameters discussed herein may dynamically vary as a function of time and location of asset 10. In accordance with the embodiment of the present invention, the plurality of characteristic profiles associated with the mobile asset 10 are determined as a function of time and a corresponding location of the mobile asset 10 along the predefined path. Hence, the fuel optimizing unit 20 may also determine the fuel combustion ratio as a function of time and a corresponding location of the mobile asset 10 based on the one or more of the plurality of characteristic profiles. Put another way, in some embodiments the fuel optimizing unit 20 may determine the fuel combustion ratio based at least in part on mobile asset operation information reflecting the actual location, engine performance, engine speed, engine output, fuel usage, emission levels, etc., that may vary from projected values for the same during the mobile asset's journey. The frequency of sensing the characteristics profiles and determination of the combustion ratio may vary depending on the type of application.

In certain embodiments, the control unit 38 may output data to a user interface 64. Advantageously, the user interface 64 may facilitate inputs via a touch screen 66 from a user to the control unit 38 and provides a mechanism through which a user can manipulate data and sensed properties from the control unit 38. As will be appreciated by those skilled in the art, the user interface 64 may include a command line interface, menu driven interface, and graphical user interface. The control unit 38 is operable to adjust the combustion ratio affecting the cost and engine emissions associated with the fuel usage. In some embodiments, the control unit 38 may communicate to a user via the user interface 64 whether it is possible to reach a predetermined destination with available of fuel(s) in the asset 10, while meeting emissions targets.

It will be appreciated that, in some settings, the mobile asset 10 may be one or a plurality of mobile assets that make up a consist or train. As used herein, a consist refers to a plurality of mobile assets operated under the control of a lead mobile asset. A lead mobile asset is a mobile asset configured for independent control, which may, at times, also provide suitable control signals configured to operate one or more remote mobile assets. A remote mobile asset is a mobile asset operated under the control of suitable control signals received from an associated lead mobile asset. Thus, in some embodiments, the methods described herein may be used to generate fuel combustion ratios for other mobile assets.

For example, a lead locomotive coupled in succession with one or more additional locomotives and/or with one or more remote locomotives elsewhere in a train may form a consist if the lead locomotive controls one or more aspects of the other locomotives' operation. This may assist with train control in hilly areas by distributing power along the train length. For example, a long train crossing a summit of a hill may benefit from a remote locomotive pushing at a rear of the train while one or more locomotives at the head of the train provide braking power for the front of the train. Harmonizing the operation of the remote locomotive and other locomotives included in the train with the lead locomotive may potentially save fuel and avoid damage to rail cars.

Figure 3:
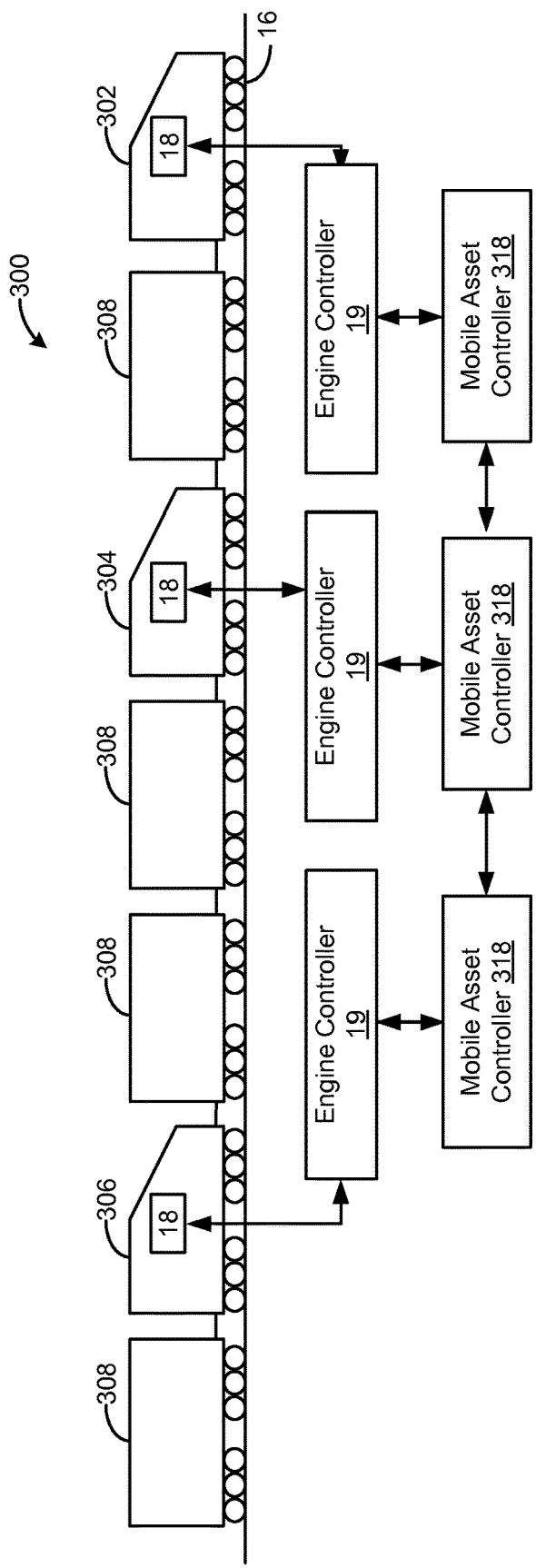
FIG. 3 is a diagrammatical representation of a train including a plurality of mobile assets in accordance with an embodiment of the present invention.

FIG. 3 diagrammatically represents a train 300 including a plurality of rail vehicles. The train 300 includes a plurality of rail vehicles including the mobile assets 302, 304, and 306 and a plurality of rail cars 308. The rail cars 308 may include any suitable rail vehicle being moved by the mobile assets, including, but not limited to, passenger cars, freight cars, unpowered/non-operating mobile assets, and so on. In some embodiments, one or more of the rail cars 308 may be configured as a fuel tender for one or more of the mobile assets. The plurality of the mobile assets shown in FIG. 3 include a lead mobile asset 302 positioned at the head of the train 300 and remote mobile assets 304 and 306 positioned elsewhere in the train 300. For example, remote mobile assets may be positioned at the head of the train along with the lead mobile asset, at the rear of the train, or anywhere in between (e.g., a mid-train location).

In the embodiment shown in FIG. 3, the mobile assets 304, 306, and 308 are powered by the engines 18. However, it will be appreciated that any suitable manner of powering the mobile assets 304, 306, and 308 may be employed without departing from the scope of the present disclosure. For example, in some embodiments, the various mobile assets included in the train 300 may have different motive power sources (e.g., diesel-electric power generated by a single-fuel engine, diesel-electric powered by a dual-fuel engine, electric power received from a catenary or a third-rail, and so on).

Each mobile asset included in a consist may include a mobile asset controller 318 configured to receive information from and transmit signals to each of the mobile assets included in train 300. In some embodiments, the mobile asset controller 318 may receive suitable signals from a variety of sensors on the train 300 and adjust train operations accordingly.

For example, in some embodiments, the mobile asset controller 318 may be configured to adjust one or more aspects of the operation of each mobile asset included in a consist (e.g., adjust traction motor output and/or traction motor transition, adjust braking power).

As another example, the mobile asset controller 318 may adjust engine operation in one or more of the mobile assets included in a consist. In the embodiment shown in FIG. 3, the mobile asset controller 318 is coupled to an engine controller 19 associated with an engine for a particular mobile asset. In turn, the engine controller 19 may adjust various aspects of the mobile asset's engine operation (e.g., engine speed setting, engine power output setting).

Figure 4:
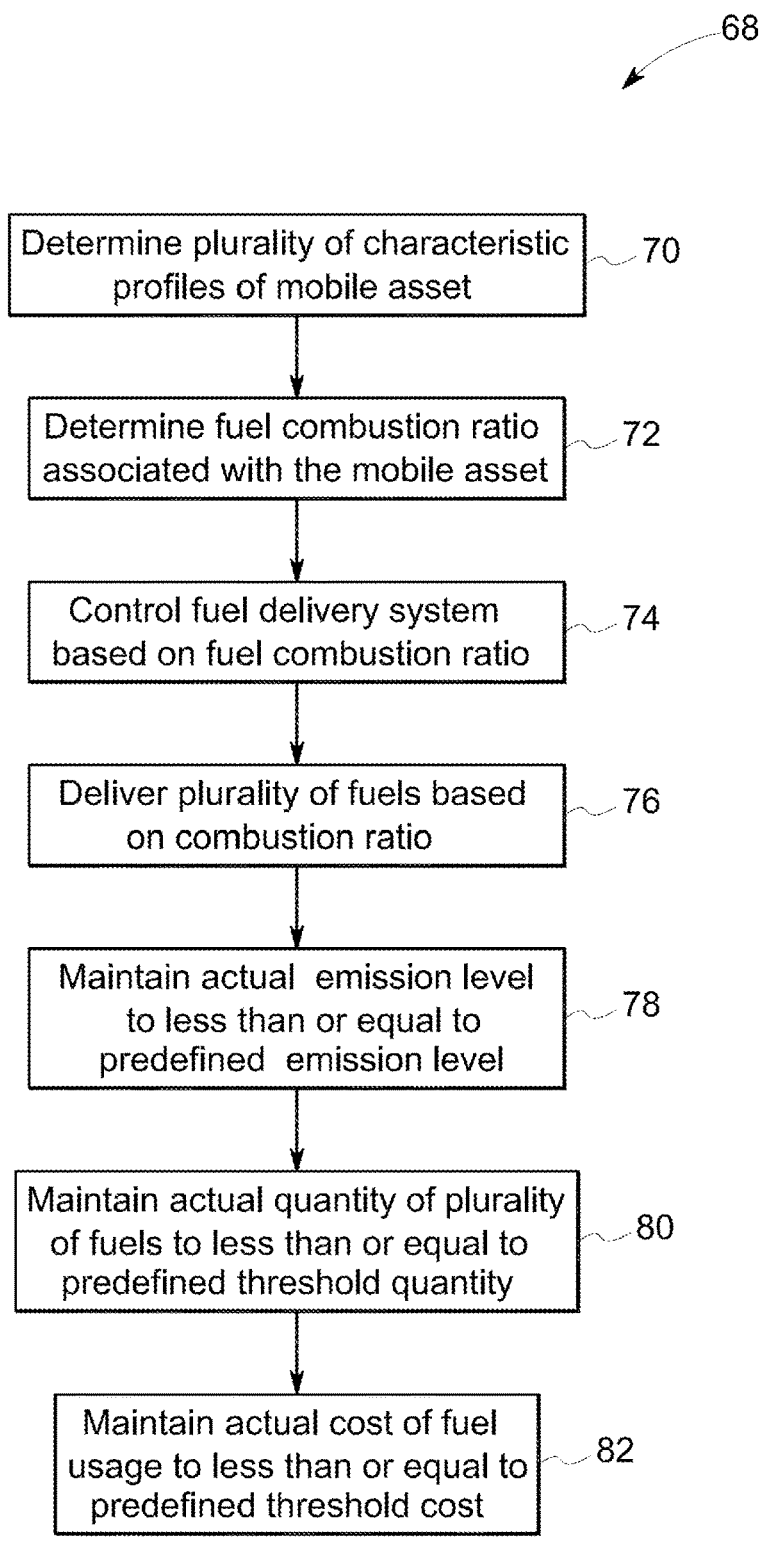
FIG. 4 is a flow diagram illustrating exemplary steps involved in optimization of fuel in a mobile asset in accordance with an embodiment of the present technique.

Referring to FIG. 4, a flow diagram 68 illustrating a plurality of steps involved in optimization of fuel for a mobile asset is disclosed. It will be appreciated that the method illustrated in the flow diagram 68 in FIG. 4 may be performed by any suitable hardware, including the hardware disclosed herein. It will also be appreciated that portions of the processes described with reference to FIG. 4 may be omitted, reordered, and/or supplemented without departing from the scope of the present disclosure.

Initially, a plurality of characteristic profiles associated with the mobile asset moving from one operating point to another operating point along a predefined path is determined as represented by the step 70. In one embodiment the characteristic profiles may include asset sensed information. In another embodiment, the characteristics profiles may include GPS information. In yet another embodiment the characteristics profile may include memory stored information. The characteristics profile may be determined as a function of time and location of the mobile asset. Then, a fuel combustion ratio of the plurality of the fuels associated with at least one engine cylinder of the mobile asset is determined based on the plurality of characteristic profiles as represented by the step 72. It should be noted herein that the fuel combustion ratio refers to a ratio of the plurality of fuels to be delivered to the at least one engine cylinder of the mobile asset. The fuel combustion ratio may also be determined as a function of time and location of the mobile asset.

A fuel delivery system is controlled based on the determined fuel combustion ratio as represented by the step 74. The fuel delivery system delivers the plurality fuels based on the determined fuel combustion ratio as represented by the step 76. As a result, the actual emission level associated with usage of the plurality of fuels is maintained to less than or equal to a predefined threshold emission level as represented by the step 78. An actual quantity of the plurality of fuels in the mobile asset is maintained less than or equal to a predefined threshold quantity as represented by the step 80. The actual cost associated with usage of the plurality of fuels is maintained to less than or equal to a predefined threshold cost as represented by the step 82.

Figure 5:
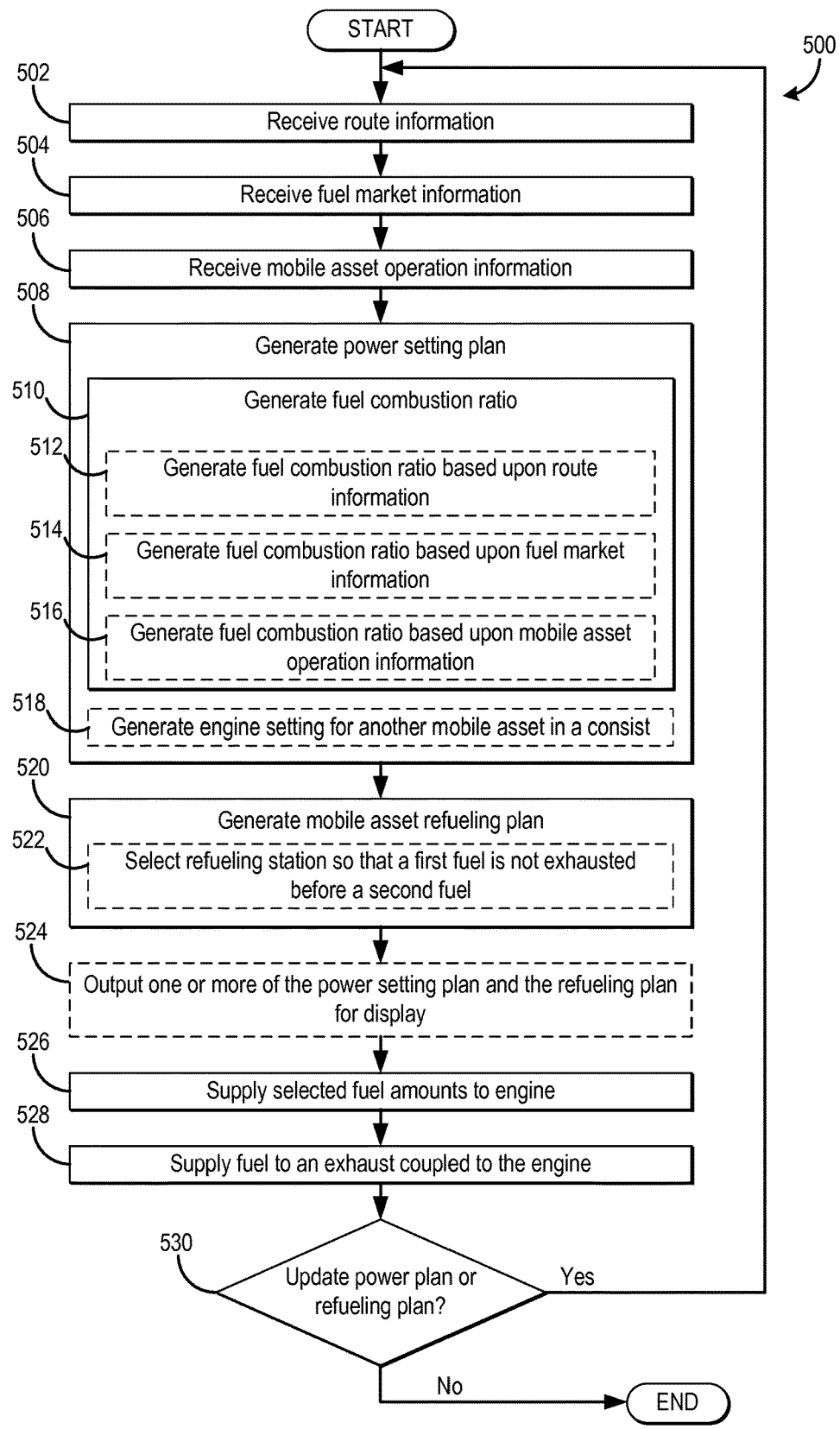
FIG. 5 is a flow diagram illustrating steps in a method of generating a mobile asset refueling plan based on example route information, mobile asset operating information, and fuel market information, in accordance with an embodiment of the present disclosure.

FIG. 5 shows a flow diagram illustrating an embodiment of a method 500 for generating a mobile asset refueling plan based on example route information, mobile asset operating information, and fuel market information. It will be appreciated that the method 500 may be performed by any suitable hardware, including the hardware disclosed herein. It will also be appreciated that portions of the processes described in the method 500 may be omitted, reordered, and/or supplemented without departing from the scope of the present disclosure.

The method 500 includes, at step 502, receiving route information at the mobile asset. The route information may be received in any suitable fashion. For example, in some embodiments the route information may be received at a client device of the mobile asset from a server through a network connection. In one example, a mobile asset may receive route information comprising one or more of geographical information about a predefined path over which the mobile asset will travel. Non-limiting examples of geographical information include location, identity, and distance information about origin and destination terminals and various intermediate stations located along the path, including fuel stations, terrain profile information, weather information along the path, and current mobile asset location information. Further, in some embodiments the mobile asset may receive projections about the operation of the mobile asset along the path. For example, the route information received may include one or more of projected mobile asset location information, projected mobile asset operation information (e.g., projected engine speed information, projected engine load information, projected engine emission information), as a function of one or more of time, location, or other suitable parameter during the journey.

At step 504, the method 500 includes receiving fuel market information at the mobile asset. The fuel market information may be received in any suitable manner. For example, in some embodiments, the fuel market information may be received at a client device of the mobile asset from a server through a network connection. In one example, a mobile asset may receive fuel market information comprising one or more of availability information and/or price information for one or more fuels combustible in the mobile asset. For example, the availability information may include availability information for one or more fuel stations along the predefined path and/or aggregated availability information (e.g., in a regional, national, or global aggregate). As another example, the price information may include fuel price information, locally for one or more fuel stations along the path or in a suitable aggregate (e.g., in a regional, national, or global aggregate), for one or more of the fuels.

At the step 506, the method 500 includes receiving mobile asset operation information. In some embodiments, mobile asset operation information may be received from various sensors and/or controllers included in the mobile asset. For example, mobile asset operation information such as a quantity of one or more of the plurality of fuels present in respective mobile asset fuel sources, actual fuel usage information, actual engine speed information, actual engine load information, actual engine emission information, and actual mobile asset location information may be received from various fuel level sensors, fuel controllers, engine controllers, GPS devices, and so on.

In some embodiments, receiving mobile asset operation information at the step 506 may include receiving information about a mobile asset's configuration, including various performance information related to the mobile asset. For example, information about a mobile asset's peak output rating, a correlation between one or more power level settings and a percentage of full power generated, engine emissions curves, acoustic emissions, electro-magnetic emissions, a number of traction motors used, fuel economy performance, adhesion limits, etc. Other configuration information, including information about the organization, presentation and functionality of operator controls, communications protocol, auxiliary functions, security measures, and the like may also be included in some embodiments.

In some embodiments, receiving mobile asset operation information at the step 506 may include receiving mobile asset operation information and/or configuration information for another mobile asset operating in a consist with a selected mobile asset. For example, configuration, sensor, and/or controller information reflecting the operation of one or more end-of-train, mid-train, or head-end mobile assets may be provided to a lead mobile asset in some of such embodiments.

At the step 508, the method 500 includes generating a power setting plan for a selected mobile asset. As used herein, a power setting plan refers to planned power settings and power setting projections for a mobile asset as it traverses a predefined path or any suitable portion thereof. Put another way, a power setting plan includes the projected engine power settings (e.g., motive power settings) for a mobile asset traveling along a predefined path. It will be appreciated that a power setting plan may include any suitable number of power settings and some or all of which may vary according to suitable route information. For example, in some embodiments, engine power setting selections may vary as a function of one or more of location along a predefined path, load information, and so on.

Because the planned power settings are affected by the engine's performance, which is affected by the energy density of the fuel supplied to the engine, generating the power setting plan at the step 508 includes, at the step 510, generating a fuel combustion ratio for the mobile asset. The fuel combustion ratio is a ratio of the plurality of fuels to be delivered to the at least one engine cylinder of the mobile asset. For example, amounts of a first fuel (e.g., diesel) and a second fuel (e.g., natural gas) are selected for combustion at the step 508. It will be appreciated that the fuel combustion ratio may vary as a function of one or more of the route information, the fuel market information, and the mobile asset operation information as described in more detail below.

In some embodiments, the fuel combustion ratio may be selected so that a projected exhaustion of a first fuel combustible in the mobile asset does not exceed a projected exhaustion of a second fuel combustible in the mobile asset. Thus, a fuel combustion ratio is selected so that one fuel type does not run out or is completely consumed by the mobile asset before another fuel type runs out. In some embodiments, the first fuel may be a primary fuel on which a mobile asset may operate even in the absence of the second fuel, which may be a secondary or supplementary fuel. For example, in some of such embodiments, a fuel combustion ratio may be selected so that a diesel fuel supply (e.g., a primary fuel) for a mobile asset is not exhausted before a natural gas fuel supply (e.g., a secondary fuel) for the mobile asset. In a scenario where a mobile asset is unable to operate on natural gas alone, the mobile asset would be operated at a fuel combustion ratio operative to exhaust the natural gas supply before the diesel supply.

In some embodiments, the fuel combustion ratio may be selected so that at least one of a first amount of fuel and a second amount of fuel included on which the fuel combustion ratio is based is within a preselected range. For example, a fuel combustion ratio may be selected so that at least 10% of the fuel supplied is diesel, or so that not more than 90% of the fuel supplied is diesel.

In some embodiments, a power setting plan may be generated based at least in part on route information for the predefined path. For example, a power setting plan may vary the engine power setting according to a path gradient, increasing the engine power setting as the mobile asset climbs a grade and decreasing an engine power setting as the mobile asset descends a grade. Accordingly, in some embodiments, generating the fuel combustion ratio at the step 510 may include generating the fuel combustion ratio based upon route information at the step 512. Selecting the fuel combustion ratio based upon route information may allow the amount of one fuel supplied to the engine to be selected based upon grade information over a portion of the determined path, train load information over a portion of the determined path, jurisdictional emission regulations related to a portion of the determined path, and so on. For example, a lower emission fuel may be provided in a greater amount over a portion of the path having a more restrictive emission regulation than in another portion of the path having a comparatively less restrictive emission regulation. Thus, one of the fuel amounts may be selected so that an actual emission level associated with usage of the plurality of fuels is less than or equal to a determined emission level included in projected emission information associated with the determined path. As another example, a higher energy density fuel may be provided in a greater amount as the mobile asset travels over a portion of the path having a higher engine demand (e.g., stemming from train loading or gradient) than in another portion of the path where a lower engine demand exists. Further, it will be appreciated that such considerations may be convoluted. For example, increasing supply of a higher energy density fuel (e.g., diesel) may help achieve a higher power level at the engine. However, the increase in power may also increase engine emissions. In turn, additional diesel may be post-injected into the engine exhaust to reduce the emissions levels using HC-SCR, increasing the diesel consumption rate.

In some embodiments, a power setting plan may be generated based at least in part upon fuel market information. For example, because different fuels may have different energy content, and thus may be able to generate different power levels, a power setting plan may generated based on fuel combustion ratios selected to conserve a selected fuel to prevent its exhaustion, and/or to exploit a market price advantage for one fuel over another, and so on. Accordingly, in some embodiments, generating the fuel combustion ratio at the step 510 may include generating the fuel combustion ratio based upon fuel market information at the step 514. Selecting the fuel combustion ratio based upon fuel market information may provide an approach to improve fuel economy, to exploit variation in fuel costs and availability among various refueling stations along the determined path, and so on. In some settings, fuel costs may be optimized using fuel market information. For example, a fuel available at a lower cost at a first fuel station may be provided in a greater amount relative to another fuel over one segment of the determined path. As another example, a fuel not available at one fuel station may be conserved, so that a lower amount of that fuel may be included in the fuel combustion ratio.

In some embodiments, a power setting plan may be generated based at least in part upon mobile asset operation information. For example, a power setting plan may be generated based upon engine power capabilities/ratings for the mobile asset and/or upon actual engine power output. Accordingly, in some embodiments, generating the fuel combustion ratio at the step 510 may include generating the fuel combustion ratio based upon mobile asset operation information at the step 516. Selecting the fuel combustion ratio based upon mobile asset operation information may allow the fuel combustion ratio to reflect actual mobile asset operating conditions. For example, actual fuel consumption/usage rates for the fuels supplied to the engine may vary relative to projected fuel supply rates. Thus, current and/or historic fuel consumption rates may refine future fuel consumption projections.

In some embodiments, generating a power setting plan at the step 510 may include, at the step 518, generating a power setting plan for one or more mobile assets included in a consist comprising a plurality of mobile assets. For example, in some embodiments, a power setting plan may be generated that includes engine power setting information for a first mobile asset in a consist. Another engine power setting plan may be generated for another mobile asset in the consist based upon the power setting for the first mobile asset. It will be appreciated that any power setting for any mobile asset included in the consist may be generated based upon a power setting for any other mobile asset included in the consist without departing from the scope of the present disclosure. For example, a power setting for a remote mobile asset may be based upon a power setting for a lead mobile asset or vice versa, or a power setting for a remote mobile asset may be based on a power setting of another remote mobile asset included in the consist.

At the step 520, the method 500 includes generating a mobile asset refueling plan. As used herein, a mobile asset refueling plan refers to selecting one or more locations along the predefined path (including terminal endpoint locations) at which one or more mobile assets may be refueled with at least one fuel combustible in an engine included in the mobile asset being refueled. In some embodiments, refueling may occur while the mobile asset is stopped at a fuel station. In some embodiments, refueling may occur while the mobile asset is in motion. For example, a selected mobile asset may be refueled from a fuel source communicating with that mobile asset (e.g., a fuel tender or a fuel supply included in another mobile asset configured to supply fuel to the selected mobile asset). The mobile asset refueling plan is generated in view of the fuel combustion ratio selected at step 510. Thus, the mobile asset refueling plan is based upon one or more of the route information, the fuel market information, and the mobile asset operation information.

In some embodiments, generating the mobile asset refueling plan at step 520 may include, at step 522, selecting a refueling station located from a plurality of fuel stations located along the predefined path so that a projected exhaustion of a first fuel is does not exceed or occur before a projected exhaustion of a second fuel. Put another way, a refueling station may be selected so that one fuel type does not run out or is completely consumed by the mobile asset before another fuel type runs out.

In some of such embodiments, the first fuel may be a primary fuel on which the mobile asset may operate even in the absence of the second fuel, which may be a secondary or supplementary fuel. For example, in some of such embodiments, a refueling station may be selected so that a diesel fuel supply (e.g., a primary fuel) for a mobile asset is not exhausted before a natural gas fuel supply (e.g., a secondary fuel) for the mobile asset. In a scenario where a mobile asset is unable to operate on natural gas alone, the mobile asset would be scheduled for refueling with diesel fuel before projected exhaustion of the diesel fuel supply.

Alternatively, in some other of such embodiments where the mobile asset may not operate on a single fuel, a refueling station may be selected so that refueling occurs before either fuel type is exhausted. In other words, the mobile asset would be refueled so that at least some (or a preselected threshold supply) of each fuel type is maintained at the mobile asset.

It will be appreciated that in some embodiments, the refueling station may be selected so that a projected exhaustion of the first fuel is does not exceed or occur before a preselected amount of the second fuel is projected to be exhausted. In such embodiments, the refueling station may be selected so that a threshold supply of the second fuel remains above a selected value.

It will be appreciated that any one of the refueling plan, the fuel combustion ratio, and/or the power setting plan may be generated based at least in part based upon one or more of any of the other. For example, a refueling plan may be generated based in part on route/time schedule considerations, a power setting plan may be altered based upon a refueling plan, a fuel combustion ratio may be adjusted based upon a refueling plan, and so on. In one scenario, engine speed or power may be managed through a power setting plan, based on fuel use, to avoid consuming one fuel type before the mobile asset arrives at a selected refueling station. In another scenario, engine speed or power may be managed to reduce (or minimize) fuel costs. In yet another scenario, a fuel combustion ratio may be selected to reduce or minimize fuel cost in view of power setting and preselected emission levels. Thus, adjustments to any of the plans or fuel ratios described above, made in view of any suitable route, fuel market, and/or mobile asset operation information, may be used to adjust another plan or fuel ratio. This may provide an approach for analyzing how a change in one variable may allow for an increase in efficiency, performance, cost reduction, at any suitable level. In some settings, such analyses may be used to optimize one or more of fuel cost, engine performance, engine emissions, travel schedule performance, maintenance costs, and so on. Further, it will be appreciated that in some embodiments, the fuel combustion ratio, the refueling plan, and/or the power setting plan may be generated iteratively (e.g., based upon successive refinements to one another) or through a suitable concurrent generation scheme (e.g., a linear programming method).

Optionally, at the step 524, the method 500 may include outputting one or more of a portion of the power setting plan and the refueling plan for display. Any suitable manner of displaying any suitable portion of any plan may be employed without departing from the scope of the present disclosure. For example, one or more of a projected fuel cost, a projected fuel usage, an actual fuel cost, an actual fuel usage, a selected refueling station and an amount of fuel to obtain at that station, and so on, may be output on a display at the mobile asset and/or at another location, such as a mobile asset dispatching center, and so on.

At the step 526, the method 500 includes supplying selected fuel amounts to one or more cylinders of an engine included in the mobile asset. Thus, the selected fuel amounts are combusted in the cylinder. For example, the fuels supplied may be combusted in a cylinder before or during a power stroke of in an engine cycle.

At the step 528, the method 500 includes supplying an exhaust coupled to the engine with a selected amount of one of the fuels. For example, a selected amount of diesel fuel may be supplied to an exhaust of the engine (e.g. upstream of an aftertreatment device and/or within a cylinder during a post-injection fuel delivery event where the fuel may pass through to the exhaust vaporized but not combusted) to manage engine emissions. In one example, an exhaust injector may be mounted to the exhaust system to supply the exhaust with the amount of diesel fuel. In such embodiments, the selected amount of the particular fuel may be chosen to maintain an actual emission level associated with usage of the plurality of fuels to less than or equal to a determined emission level.

At the step 530, the method 500 includes determining whether to update the power setting plan and/or the mobile asset refueling plan. An update may be performed at any suitable time before beginning the journey or during the journey. In some embodiments, an update may occur according to a determined schedule, upon command from a server and/or a client device (e.g., through pushing or pulling an update to a client device on mobile asset), upon detection of a change in one or more of the route information, the fuel market information, and/or the mobile asset operation information, and so on. In one scenario, an update may occur at a preset interval. In another scenario, an update may occur upon determining that a fuel station has exhausted a fuel supply or changed the price of a fuel. In yet another scenario, an update may occur upon detecting that a mobile asset has been derated. If it is judged that an update is to occur, the method 500 returns to the step 502. Consequently, one or more of the power setting plan, fuel combustion ratio, and/or refueling plan may be updated responsive to a change in route information, fuel market information, and/or mobile asset operation information. If no update is to be performed, the method 500 ends, or may optionally await further determination on potential future updates.

Figure 6:
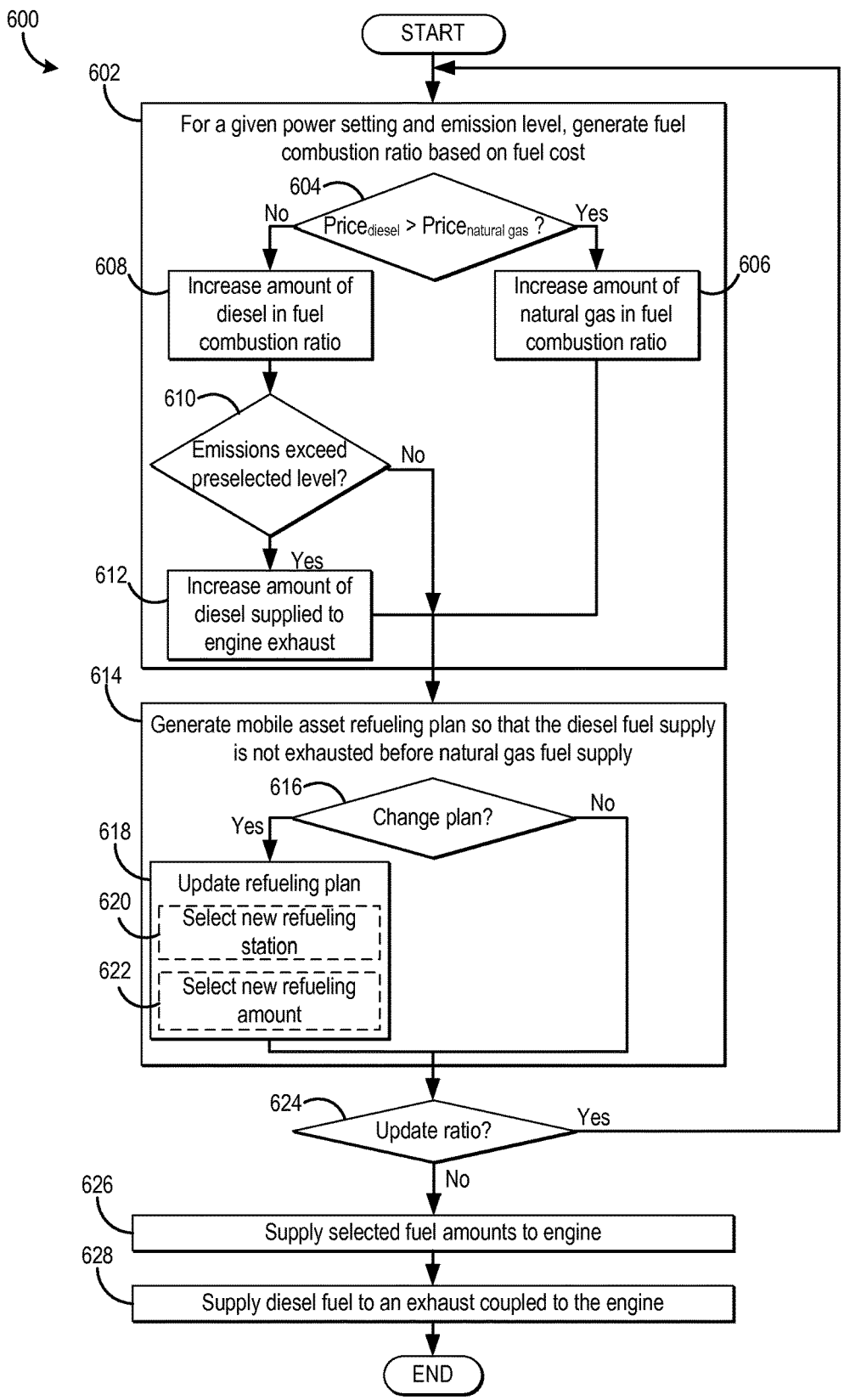
FIG. 6 is a flow diagram illustrating an example of generating a mobile asset refueling plan and a fuel combustion ratio for a given power setting and emission level, in accordance with an embodiment of the present disclosure.

As explained above, the methods described herein may be used to adjust fuel costs in view of any suitable mobile asset and/or trip variable. FIG. 6 depicts a non-limiting example 600 of how a fuel combustion ratio and a refueling plan may be selected for a given power setting and NOx emissions level. It will be appreciated that other emissions species, such as particulate matter, COx, and so on, may be managed by managing one or more suitable fuel supply variables in view of fuel market information without departing from the scope of the present disclosure. The steps described in the example 600 may be performed in any suitable way, including the manner described above in the method 500. Further, the steps described in the example 600 may be supplemented, re-ordered, and/or omitted in some embodiments without departing from the scope of the present disclosure.

In the example shown in FIG. 6, an engine included in a mobile asset may run on a combination of diesel fuel and natural gas or on diesel fuel alone and to treat at least a portion of the exhaust emissions using HC-SCR. However, in this example, the engine is not configured to operate on natural gas alone. Accordingly, the fuel combustion ratio and refueling plan are determined so that the diesel fuel supply is not exhausted before the natural gas fuel supply, potentially avoiding a situation where the mobile asset becomes inoperative.

At the step 602, the example 600 includes generating a fuel combustion ratio for a given power setting and emission level. A given power setting may be accessible through one or more fuel combustion ratios. Fuel combustion ratios richer in diesel fuel may lead to greater NOx emissions. In turn, more diesel fuel may be injected into the engine exhaust to maintain NOx emissions below a preselected level. Fuel combustion ratios rich in natural gas may have lower NOx emission levels but may be accompanied by greater natural gas fuel consumption rates. While a variety of fuel combustion ratios may achieve a selected power setting, the operating cost may vary among those ratios according to fuel usage and fuel cost. Moreover, the availability of one or more fuels may affect the fuel combustion ratio as well, as it may be undesirable to exhaust (or come within a threshold of exhausting) one or more of the fuels.

At the step 604, the example 600 includes determining whether the price of diesel fuel is greater than the price of natural gas. The determination may be made using any suitable price information for the fuels, such as price information at one or more fuel stations, average price information on a national, regional, or local level, and so on. If the price of diesel fuel is greater than that of natural gas, there may be a cost savings realized by increasing the amount of natural gas consumed in the engine. Thus, the example 600 includes increasing the amount of natural gas in the fuel combustion ratio at the step 606. In some examples, increasing the amount of natural gas combusted may increase COx emissions, which may be managed by a suitable diesel oxidation catalyst, but may not appreciably increase NOx emissions.

Alternatively, if the price of diesel fuel is lower than that of natural gas, there may be a cost savings realized by increasing the amount of diesel fuel consumed in the engine. The example 600 includes increasing the amount of diesel fuel in the fuel combustion ratio at the step 608 in view of this potential savings. However, because the NOx emissions are to be maintained below a preselected level for the power setting, increasing the amount of diesel fuel supplied to the engine may increase the NOx emissions level beyond the preselected amount. Thus, at the step 610, the example 600 includes determining whether the NOx emissions exceed a preselected level. If the NOx emissions exceed a preselected level, the amount of diesel supplied to the engine exhaust is increased at the step 612 to treat the increased NOx emissions. If the NOx emissions do not exceed the preselected level, no additional diesel is supplied.

In some embodiments, increasing the amount of diesel supplied to the exhaust at the step 612 may be accompanied by suitable adjustment(s) to a power stroke fuel supply at the cylinder (e.g., adjusting one or more of the injection timing, injection pressure, manifold air temperature), an exhaust gas recirculation system, and/or a urea-based selective catalytic reduction system. Such adjustments may be made in view of the fuel price information, reductant supply information, and so on.

At the step 614, the example 600 includes generating a mobile asset refueling plan so that the diesel fuel supply is not exhausted before the natural gas fuel supply. The price or emissions considerations described above may have caused the fuel combustion ratio to be adjusted, potentially leading to an update in the refueling plan as determined at the step 616. At the step 618, the refueling plan is updated. In some embodiments, updating the refueling plan at the step 618 may include, at the step 620, selecting a new refueling station (e.g., based upon availability on-board the mobile asset and/or at a fuel station, fuel consumption, fuel price). Additionally or alternatively, in some embodiments, updating the refueling plan at the step 618 may include selecting a new refueling amount at the step 622.

The potential changes described above may alter the fuel cost. Thus, at the step 624, the example 600 includes determining whether to update the fuel consumption ratio to reduce the fuel cost. If an update is desired, the routine returns to the step 602 and repeats. Successive iteration of the routine may generate a set of fuel consumption ratios providing a preselected fuel cost at a given power setting and emissions level within an acceptable tolerance. In some settings, successive iteration may lead to an optimized fuel consumption ratio. If no update is desired, the fuel consumption ratio is used to supply diesel and natural gas fuels to the engine in the selected amounts at the step 626. At the step 628, a selected amount of diesel fuel is supplied to the exhaust. It will be appreciated that subsequent changes to the fuel consumption ratio may be made at any suitable time, such as in response to any suitable route information, fuel market information, and/or mobile asset operation information, including changes thereto.

In another embodiment, a method for operating a mobile asset comprises supplying an engine of the mobile asset with a first amount of a first fuel and a second amount of a second fuel. The first amount and the second amount are selected based on route information for a route along which the mobile asset is operable to travel and fuel market information, and so as to achieve a projected exhaustion of the first fuel that does not precede a projected exhaustion of the second fuel.

In another embodiment, a method for operating a mobile asset comprises supplying an engine of the mobile asset with a first amount of a first fuel and a second amount of a second fuel. The first amount and the second amount are selected based on route information for a route along which the mobile asset is operable to travel and fuel market information, and so as to achieve a projected exhaustion of the first fuel that does not precede a projected exhaustion of the second fuel by more than a designated limit. For example, in the case where the engine can operate on the second fuel alone, but where operation using both fuels may be desirable (e.g., for improved fuel economy or improved engine emissions), the designated limit might be a projected level of the second fuel, remaining after the projected exhaustion of the first fuel, that would allow operation of the mobile asset for a time period that does not negate the beneficial effects of operation using both fuels.

In another embodiment, a method for operating a mobile asset comprises supplying a first fuel to an engine of the mobile asset at a first rate, and a second fuel to the engine at a second rate. (The engine is configured to operate using the two fuels, as a dual fuel engine.) The first rate and the second rate are determined such that a projected exhaustion of the first fuel does not precede a projected exhaustion of the second fuel. The first rate and the second rate are determined based at least in part on route information for a route along which the mobile asset is operable to travel and/or fuel market information (e.g., the first rate and the second rate may be determined based on both route information and fuel marketing information). In another embodiment, the first rate and the second rate are determined such a projected exhaustion of a total amount (or other designated amount) of the first fuel carried on board the mobile asset does not precede a projected exhaustion of a total amount (or other designated amount) of the second fuel carried on board the mobile asset. In another embodiment, the first rate and the second rate are determined relative to a projected exhaustion of the first fuel and a projected exhaustion of the second fuel, taking into account both the amounts of the first and second fuels carried on board the mobile asset and re-fueling opportunities of the first and/or second fuels along the route.

In some embodiments, a method for operating a mobile asset may comprise supplying an engine with a first amount of a first fuel and a second amount of a second fuel, the first amount and the second amount being selected based on one or more of route information for a fixed route along which the mobile asset is operable to travel or fuel market information associated with the first fuel and the second fuel, so that a projected exhaustion of a particular fuel does not precede projected arrival of the mobile asset at a location where the mobile asset may be resupplied with that selected fuel.

For example, in a dual fuel locomotive configured to operate on diesel fuel and natural gas, it may desirable to substitute a less expensive fuel for a more expensive fuel to reduce fuel consumption costs. Thus, a selected amount of a first fuel may be substituted for a second fuel. In some settings, the amount substituted may be selected based on mobile asset operation information, such as designated fuel substitution range information. For example, a first fuel may be substituted for a second fuel up to a designated substitution ceiling in one scenario. Because it may be inconvenient to exhaust one fuel (or to come within a designated threshold of exhausting one fuel) in some settings, the amount substituted may be selected so that the substituted fuel is not exhausted before the mobile asset arrives at a refueling station where the substituted fuel may be replenished.

Figure 7:
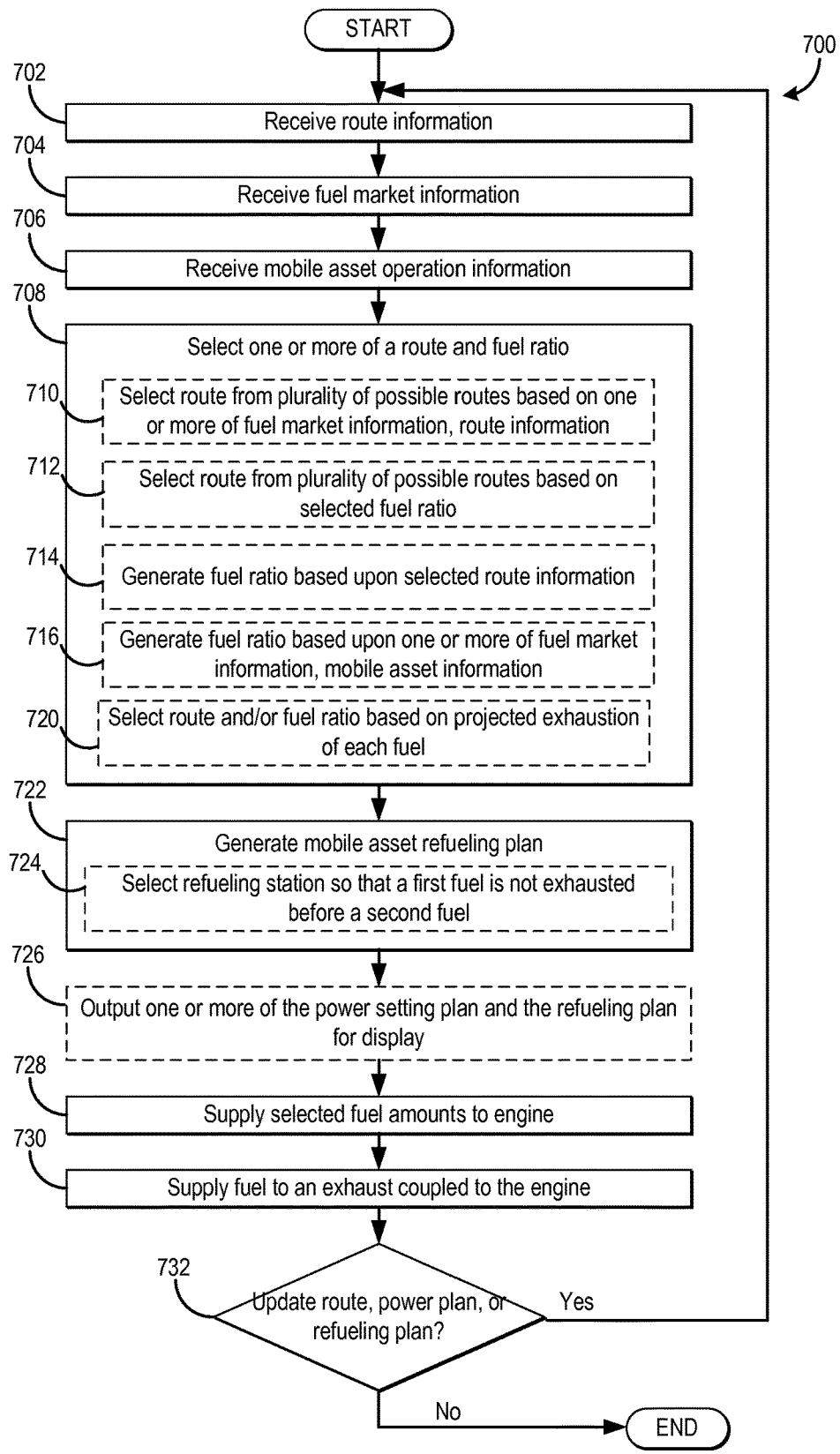
FIG. 7 is a flow diagram illustrating steps in a method of generating a mobile asset refueling plan based on example route information, mobile asset operating information, and fuel market information, in accordance with another embodiment of the present disclosure.

FIG. 7 shows a flow diagram illustrating an embodiment of a method 700 for generating a mobile asset refueling plan based on example route information, mobile asset operating information, and fuel market information. It will be appreciated that the method 700 may be performed by any suitable hardware, including the hardware disclosed herein. In one example, method 700 may be performed according to non-transitory instructions stored in memory of a controller, such as engine controller 19 and/or mobile asset controller 318. It will also be appreciated that portions of the processes described in the method 700 may be omitted, reordered, and/or supplemented without departing from the scope of the present disclosure.

The method 700 includes, at step 702, receiving route information at the mobile asset. The route information may be received in any suitable fashion. For example, in some embodiments the route information may be received at a client device of the mobile asset from a server through a network connection. In one example, the route information may include route information for a plurality of possible routes that the mobile asset may be operable to travel. For example, the starting and ending locations may be defined, and then one or more possible routes may be generated for the mobile asset to travel from the starting location to the ending location.

Each route of the plurality of possible routes may have associated route information. The mobile asset may receive route information for each possible route comprising geographical information about each route, for example. Non-limiting examples of geographical information include location, identity, and distance information about origin and destination terminals and various intermediate stations located along the path, including fuel stations, terrain profile information, weather information along the path, and current mobile asset location information. Further, in some embodiments the mobile asset may receive projections about the operation of the mobile asset along each possible route. For example, the route information received may include one or more of projected mobile asset location information, projected mobile asset operation information (e.g., projected engine speed information, projected engine load information, projected engine emission information), as a function of one or more of time, location, or other suitable parameter during the journey.

Further, in some examples each route of the plurality of possible routes may be a fixed route, wherein once the mobile asset commits to a selected route, it remains on the selected route for the entirety of the journey (e.g., until the mobile asset reaches the ending location). However, in other examples one or more routes of the plurality of possible routes may not be fixed, such that it is possible for the mobile asset to select an initial route and then switch to another route. Accordingly, updated route information may be provided to the mobile asset during the course of its journey.

At step 704, the method 700 includes receiving fuel market information at the mobile asset. The fuel market information may be received in any suitable manner. For example, in some embodiments, the fuel market information may be received at a client device of the mobile asset from a server through a network connection. In one example, a mobile asset may receive fuel market information comprising one or more of availability information and/or price information for one or more fuels combustible in the mobile asset. For example, the availability information may include availability information for one or more fuel stations along each of the routes (or along a selected route) and/or aggregated availability information (e.g., in a regional, national, or global aggregate). As another example, the price information may include fuel price information, locally for one or more fuel stations along the one or more routes or in a suitable aggregate (e.g., in a regional, national, or global aggregate), for one or more of the fuels. Further, the fuel market information described above may also include availability and/or price of electric charging stations, availability and/or price of hydrogen fuel or hydrogen fuel precursor dispensing stations, or other suitable fuel information.

At the step 706, the method 700 includes receiving mobile asset operation information. In some embodiments, mobile asset operation information may be received from various sensors and/or controllers included in the mobile asset. For example, mobile asset operation information such as a quantity of one or more of the plurality of fuels present in respective mobile asset fuel sources, actual fuel usage information, actual engine speed information, actual engine load information, actual engine emission information, and actual mobile asset location information may be received from various fuel level sensors, fuel controllers, engine controllers, GPS devices, and so on.

In some embodiments, receiving mobile asset operation information at the step 706 may include receiving information about a mobile asset's configuration, including various performance information related to the mobile asset. For example, information about a mobile asset's peak output rating, a correlation between one or more power level settings and a percentage of full power generated, engine emissions curves, acoustic emissions, electro-magnetic emissions, a number of traction motors used, fuel economy performance, adhesion limits, etc. Other configuration information, including information about the organization, presentation and functionality of operator controls, communications protocol, auxiliary functions, security measures, and the like may also be included in some embodiments.

In some embodiments, receiving mobile asset operation information at the step 706 may include receiving mobile asset operation information and/or configuration information for another mobile asset operating in a consist with a selected mobile asset. For example, configuration, sensor, and/or controller information reflecting the operation of one or more end-of-train, mid-train, or head-end mobile assets may be provided to a lead mobile asset in some of such embodiments.

At 708, the method 700 includes selecting one or more of a route and a fuel ratio of a first fuel to a second fuel for propelling the mobile asset. The selected route and/or fuel ratio may be chosen based on suitable information, including fuel availability information, fuel quantities in each fuel source for one or more fuels, projected exhaustion of each fuel, route information, etc., as will be described below. The fuel ratio may be a ratio of power derived from a first fuel to power derived from a second fuel. In some examples, the fuel ratio may be a fuel combustion ratio including a ratio of the plurality of fuels to be delivered to the at least one engine cylinder of the mobile asset. For example, the fuel combustion ratio may include an amount of a first fuel (e.g., diesel) and a second fuel (e.g., natural gas). However, in some examples the fuel ratio may include a fuel that is not delivered to at least one cylinder, such as electricity used to power the engine crankshaft, one or more traction motors, etc., in order to propel the mobile asset.

Selecting one or more of a route and a fuel ratio may include selecting a route from a plurality of possible routes based on one or more of fuel market information and route information, as indicated at 710. In one example, the fuel market information may include fuel availability information for one or more fuels such that the selected route includes at least one refueling station for one or more of the fuels. In another example, the selected route may be chosen based on route information to minimize miles travelled, steep terrain, etc.

Selecting one or more of a route and a fuel ratio may include selecting a route from a plurality of possible routes based a selected fuel ratio, as indicated at 712. The fuel ratio may be selected based on fuel market information, mobile asset information, desired emissions, etc., as will be explained in more detail below. Once a fuel ratio is selected (or in some examples, one or more target fuel ratios), a route may be selected from among the plurality of possible routes to enable operation of the mobile asset at the selected fuel ratio(s). For example, to conserve usage of a first fuel (e.g., diesel), a fuel ratio that includes a relatively high proportion of a second fuel (e.g., natural gas) may be chosen. However, power output while using the second fuel may be relatively low compared to power output while using a higher proportion of the first fuel, so a route may be chosen that minimizes travel on steep grades. In another example, a route may be chosen that provides for opportunity to refuel the second fuel, for example, to ensure operation at the selected fuel ratio.

Selecting one or more of a route and a fuel ratio may include generating a fuel ratio based on route information for a selected route, as indicated at 714. In one example, the fuel ratio is selected based only on the selected route and not on the non-selected routes. Selecting the fuel ratio based upon route information may allow the amount of one fuel supplied to the engine to be selected based upon grade information over a portion of the selected route, train load information over a portion of the selected route, jurisdictional emission regulations related to a portion of the selected route, and so on. For example, a lower emission fuel may be provided in a greater amount over a portion of the route having a more restrictive emission regulation than in another portion of the route having a comparatively less restrictive emission regulation. Thus, one of the fuel amounts may be selected so that an actual emission level associated with usage of the plurality of fuels is less than or equal to a determined emission level included in projected emission information associated with the selected route. As another example, a higher energy density fuel may be provided in a greater amount as the mobile asset travels over a portion of the route having a higher engine demand (e.g., stemming from train loading or gradient) than in another portion of the route where a lower engine demand exists. Further, it will be appreciated that such considerations may be convoluted. For example, increasing supply of a higher energy density fuel (e.g., diesel) may help achieve a higher power level at the engine. However, the increase in power may also increase engine emissions. In turn, additional diesel may be post-injected into the engine exhaust to reduce the emissions levels using HC-SCR, increasing the diesel consumption rate.

Selecting one or more of a route and a fuel ratio may include generating a fuel ratio based on one or more of fuel market information and mobile asset information, as indicated at 716. For example, because different fuels may have different energy content, and thus may be able to generate different power levels, one or more fuel ratios may be selected to conserve a selected fuel to prevent its exhaustion, and/or to exploit a market price advantage for one fuel over another, and so on. Selecting the fuel ratio based upon fuel market information may provide an approach to improve fuel economy, to exploit variation in fuel costs and availability among various refueling stations along one or more routes, and so on. In some settings, fuel costs may be optimized using fuel market information. For example, a fuel available at a lower cost at a first fuel station may be provided in a greater amount relative to another fuel over one segment of the route. As another example, a fuel not available at one fuel station may be conserved, so that a lower amount of that fuel may be included in the fuel ratio.

In some embodiments, generating the fuel ratio may include generating the fuel ratio based upon mobile asset operation information. Selecting the fuel ratio based upon mobile asset operation information may allow the fuel ratio to reflect actual mobile asset operating conditions. For example, actual fuel consumption/usage rates for the fuels supplied to the engine may vary relative to projected fuel supply rates. Thus, current and/or historic fuel consumption rates may refine future fuel consumption projections.

Selecting one or more of a route and a fuel ratio may include selecting a route and/or a fuel ratio based on a projected exhaustion of each fuel, as indicated at 720. In some embodiments, the fuel ratio may be selected so that a projected exhaustion of a first fuel usable to propel the mobile asset does not exceed a projected exhaustion of a second fuel usable to propel the mobile asset. Thus, a fuel ratio is selected so that one fuel type does not run out or is completely consumed by the mobile asset before another fuel type runs out. In some embodiments, the first fuel may be a primary fuel on which a mobile asset may operate even in the absence of the second fuel, which may be a secondary or supplementary fuel. For example, in some of such embodiments, a fuel ratio may be selected so that a diesel fuel supply (e.g., a primary fuel) for a mobile asset is not exhausted before a natural gas fuel supply (e.g., a secondary fuel) for the mobile asset. In a scenario where a mobile asset is unable to operate on the secondary fuel (e.g., natural gas) alone, the mobile asset would be operated at a fuel ratio operative to exhaust the natural gas supply before the diesel supply.

In some embodiments, the fuel ratio may be selected so that at least one of a first amount of fuel and a second amount of fuel included on which the fuel ratio is based is within a preselected range. For example, a fuel ratio may be selected so that at least 10% of the fuel supplied is diesel, or so that not more than 90% of the fuel supplied is diesel.

As explained above with respect to FIG. 5, a power setting plan may be generated that includes the selected/generated fuel ratio(s). The power setting plan may be generated based on the above described parameters (e.g., route information, fuel availability, mobile asset information) and then corresponding fuel ratios may be generated. In other examples, one or more fuel ratios may be selected as described above and then a power setting plan generated that includes the selected fuel ratios. Further, as explained above, the power setting plan may be generated for one or more mobile assets included in a consist.

At the step 722, the method 700 includes generating a mobile asset refueling plan. As used herein, a mobile asset refueling plan refers to selecting one or more locations along the selected route (including terminal endpoint locations) at which one or more mobile assets may be refueled. In some embodiments, refueling may occur while the mobile asset is stopped at a fuel station. In some embodiments, refueling may occur while the mobile asset is in motion. For example, a selected mobile asset may be refueled from a fuel source communicating with that mobile asset (e.g., a fuel tender or a fuel supply included in another mobile asset configured to supply fuel to the selected mobile asset). The mobile asset refueling plan is generated in view of the fuel ratio selected at step 708. Thus, the mobile asset refueling plan may be based upon one or more of the route information, the fuel market information, and the mobile asset operation information.

In some embodiments, generating the mobile asset refueling plan at step 722 may include, at step 724, selecting a refueling station located from a plurality of fuel stations located along the predefined path so that a projected exhaustion of a first fuel is does not exceed or occur before a projected exhaustion of a second fuel. Put another way, a refueling station may be selected so that one fuel type does not run out or is completely consumed by the mobile asset before another fuel type runs out.

In some of such embodiments, the first fuel may be a primary fuel on which the mobile asset may operate even in the absence of the second fuel, which may be a secondary or supplementary fuel. For example, in some of such embodiments, a refueling station may be selected so that a diesel fuel supply (e.g., a primary fuel) for a mobile asset is not exhausted before a natural gas fuel supply (e.g., a secondary fuel) for the mobile asset. In a scenario where a mobile asset is unable to operate on natural gas alone, the mobile asset would be scheduled for refueling with diesel fuel before projected exhaustion of the diesel fuel supply.

Alternatively, in some other of such embodiments where the mobile asset may not operate on a single fuel, a refueling station may be selected so that refueling occurs before either fuel type is exhausted. In other words, the mobile asset would be refueled so that at least some (or a preselected threshold supply) of each fuel type is maintained at the mobile asset.

It will be appreciated that in some embodiments, the refueling station may be selected so that a projected exhaustion of the first fuel is does not exceed or occur before a preselected amount of the second fuel is projected to be exhausted. In such embodiments, the refueling station may be selected so that a threshold supply of the second fuel remains above a selected value.

It will be appreciated that any one of the selected route, refueling plan, the fuel ratio, and/or the power setting plan may be generated based at least in part based upon one or more of any of the other. For example, a refueling plan may be generated based in part on route/time schedule considerations, a power setting plan may be altered based upon a refueling plan, a fuel ratio may be adjusted based upon a refueling plan, and so on. In one scenario, engine speed or power may be managed through a power setting plan, based on fuel use, to avoid consuming one fuel type before the mobile asset arrives at a selected refueling station. In another scenario, engine speed or power may be managed to reduce (or minimize) fuel costs. In yet another scenario, a fuel ratio may be selected to reduce or minimize fuel cost in view of power setting and preselected emission levels. Thus, adjustments to any of selected route, the plans, or fuel ratios described above, made in view of any suitable route, fuel market, and/or mobile asset operation information, may be used to adjust another route, plan, or fuel ratio. This may provide an approach for analyzing how a change in one variable may allow for an increase in efficiency, performance, cost reduction, at any suitable level. In some settings, such analyses may be used to optimize one or more of fuel cost, engine performance, engine emissions, travel schedule performance, maintenance costs, and so on. Further, it will be appreciated that in some embodiments, the selected route, the fuel ratio, the refueling plan, and/or the power setting plan may be generated iteratively (e.g., based upon successive refinements to one another) or through a suitable concurrent generation scheme (e.g., a linear programming method).

Optionally, at the step 726, the method 700 may include outputting one or more of a portion of the power setting plan and the refueling plan for display. Any suitable manner of displaying any suitable portion of any plan may be employed without departing from the scope of the present disclosure. For example, one or more of a projected fuel cost, a projected fuel usage, an actual fuel cost, an actual fuel usage, a selected refueling station and an amount of fuel to obtain at that station, and so on, may be output on a display at the mobile asset and/or at another location, such as a mobile asset dispatching center, and so on.

At the step 728, the method 700 includes supplying selected fuel amount(s) to one or more cylinders of an engine included in the mobile asset. Thus, the selected fuel amount(s) are combusted in the cylinder. For example, the fuel(s) supplied may be combusted in a cylinder before or during a power stroke of in an engine cycle.

At the step 730, the method 700 includes supplying an exhaust coupled to the engine with a selected amount of one of the fuels. For example, a selected amount of diesel fuel may be supplied to an exhaust of the engine (e.g. upstream of an aftertreatment device and/or within a cylinder during a post-injection fuel delivery event where the fuel may pass through to the exhaust vaporized but not combusted) to manage engine emissions. In one example, an exhaust injector may be mounted to the exhaust system to supply the exhaust with the amount of diesel fuel. In such embodiments, the selected amount of the particular fuel may be chosen to maintain an actual emission level associated with usage of the plurality of fuels to less than or equal to a determined emission level.

At the step 732, the method 700 includes determining whether to update the route, power setting plan, and/or the mobile asset refueling plan. An update may be performed at any suitable time before beginning the journey or during the journey. In some embodiments, an update may occur according to a determined schedule, upon command from a server and/or a client device (e.g., through pushing or pulling an update to a client device on mobile asset), upon detection of a change in one or more of the route information, the fuel market information, and/or the mobile asset operation information, and so on. In one scenario, an update may occur at a preset interval. In another scenario, an update may occur upon determining that a fuel station has exhausted a fuel supply or changed the price of a fuel. In yet another scenario, an update may occur upon detecting that a mobile asset has been derated. If it is judged that an update is to occur, the method 700 returns to the step 702. Consequently, one or more of the route, power setting plan, fuel ratio, and/or refueling plan may be updated responsive to a change in route information, fuel market information, and/or mobile asset operation information. If no update is to be performed, the method 700 ends, or may optionally await further determination on potential future updates.

An embodiment relates to a method for operating a mobile asset. The method includes supplying an engine with a fuel controller a first amount of a first fuel and a second amount of a second fuel; and combusting the first fuel and the second fuel at a fuel combustion ratio in at least one cylinder of the engine, the first amount and the second amount being selected based on route information for a route along which the mobile asset is operable to travel and a projected exhaustion of the first fuel that does not precede a projected exhaustion of the second fuel, wherein the mobile asset is unable to operate with the second fuel alone.

In an example, the first amount and the second amount are selected further based on a remaining quantity of the first fuel in a first fuel source and a remaining quantity of the second fuel in a second fuel source. In an example, the first amount and the second amount are selected further based on fuel market information including, for at least one of the first fuel or the second fuel, one or more of availability information or price information, and wherein the fuel market information includes fuel market information for one or more fuel stations along the route. In an example, the route information includes one or more of projected mobile asset location information, projected fuel usage information, projected engine speed information, projected engine load information, projected engine emission information, or fuel station location information for one or more fuel stations along the route, and wherein the first amount and second amount are further selected based on mobile asset operation information including one or more of actual engine speed information, actual engine load information, actual engine emission information, or actual mobile asset location information. In an example, the first amount and the second amount are further selected based upon mobile asset operation information including one or more of a quantity of at least one of the first or second fuels present in respective mobile asset fuel sources or actual fuel usage information. In an example, selecting the first amount and the second amount further based upon mobile asset operation information comprises determining a predicted first amount of the first fuel and a predicted second amount of the second fuel based at least in part on projected fuel usage information and adjusting the predicted first amount of the first fuel and the predicted second amount of the second fuel based on one or more of actual fuel usage information, actual engine speed information, actual engine load information, actual engine emission information, or actual mobile asset location information. In an example, at least one of the first amount or the second amount is further selected so that an actual emission level associated with usage of the first and second fuels is less than or equal to a determined emission level included in projected emission information associated with the route. In an example, the method further comprises supplying an engine exhaust with a third amount of the first fuel so that the actual emission level associated with usage of the first and second fuels is less than or equal to the determined emission level. In an example, the method further comprises selecting, from a plurality of fuel stations along the route, a particular fuel station for refueling the mobile asset with at least one of the first or second fuels based upon the route information so that the projected exhaustion of the first fuel does not precede the projected exhaustion of the second fuel. In an example, the first amount and the second amount are further selected so that the projected exhaustion of a particular fuel selected from the first fuel and the second fuel does not precede projected arrival of the mobile asset at a location where the mobile asset may be resupplied with that particular fuel.

Another embodiment of a method for operating a mobile asset includes selecting a route from a plurality of possible routes along which the mobile asset is operable to travel based on fuel availability information for at least one of a first fuel or a second fuel at one or more fuel stations along the plurality of routes; and supplying an engine of the mobile asset with the first fuel and the second fuel at a fuel combustion ratio for combustion in at least one cylinder of the engine, the fuel combustion ratio selected based on the selected route.

In an example, the fuel combustion ratio is further selected based on a projected exhaustion of the first fuel that does not precede a projected exhaustion of the second fuel, and wherein the mobile asset is unable to operate with the second fuel alone. In an example, the fuel combustion ratio is further selected so that the projected exhaustion of a particular fuel selected from the first fuel and the second fuel does not precede projected arrival of the mobile asset at a location where the mobile asset may be resupplied with that particular fuel, the fuel combustion ratio further based on the fuel availability information along the selected route.

A further embodiment of a method for operating a mobile asset includes propelling the mobile asset with one or more of a first fuel and a second fuel; and selecting one or more of a fuel ratio of the first fuel to the second fuel for propelling the mobile asset and a route from a plurality of possible routes along which the mobile asset is operable to travel based on availability information for at least one of the first fuel or the second fuel at one or more fuel stations along the plurality of routes.

In an example, selecting one or more of the fuel ratio or the route comprises: selecting a route from the plurality of possible routes; and selecting a fuel ratio based on availability information for the first fuel and second fuel at one or more fuel stations along the selected route so that a projected exhaustion of a particular fuel selected from the first fuel and the second fuel does not precede projected arrival of the mobile asset at a fuel station where the mobile asset may be resupplied with that particular fuel, the fuel ratio further selected based on the selected route and not non-selected routes. In another example, selecting one or more of the fuel ratio or the route comprises: selecting a fuel ratio based on one or more of fuel market information and mobile asset operation information; and selecting a route from the plurality of possible routes based on the selected fuel ratio and the fuel market information so that a projected exhaustion of a particular fuel selected from the first fuel and the second fuel does not precede projected arrival of the mobile asset at a fuel station where the mobile asset may be resupplied with that particular fuel. In an example, the route is further selected based on route information for each route of the plurality of possible routes, the route information including, for each route, one or more of projected mobile asset location information, projected fuel usage information, projected engine speed information, projected engine load information, projected engine emission information, or fuel station location information for one or more fuel stations along each route. In an example, the mobile asset operation information includes one or more of a quantity of at least one of the first or second fuels present in respective mobile asset fuel sources, actual fuel usage information, actual engine speed information, actual engine load information, actual engine emission information, or actual mobile asset location information. In an example, the first fuel comprises diesel, gasoline, or natural gas. In an example, the second fuel comprises natural gas, electricity, or hydrogen.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. While only certain features of the invention have been illustrated and described herein, many modifications and changes will occur to those skilled in the art. It is, therefore, to be understood that the appended claims are intended to cover all such modifications and changes as fall within the true spirit of the invention. Such other examples are intended to be within the scope of the claims if they have structural elements that do not differ from the literal language of the claims, or if they include equivalent structural elements with insubstantial differences from the literal languages of the claims.

The invention claimed is:

1. A method for operating a mobile asset, comprising:
    supplying an engine with a fuel controller a first amount of a first fuel and a second amount of a second fuel; and
    combusting the first fuel and the second fuel at a fuel combustion ratio in at least one cylinder of the engine, the fuel combustion ratio being selected based on route information for a route along which the mobile asset is operable to travel and a projected exhaustion of the first fuel that does not precede a projected exhaustion of the second fuel, wherein the mobile asset is unable to operate with the second fuel alone; and
    wherein the fuel combustion ratio is further selected so that an actual emission level associated with usage of the first and second fuels is less than or equal to a determined emission level included in projected emission information associated with the route.

2. The method of claim 1, wherein the first amount and the second amount are selected further based on a remaining quantity of the first fuel in a first fuel source and a remaining quantity of the second fuel in a second fuel source.

3. The method of claim 1, wherein the first amount and the second amount are selected further based on fuel market information including, for at least one of the first fuel or the second fuel, one or more of availability information or price information, and wherein the fuel market information includes fuel market information for one or more fuel stations along the route.

4. The method of claim 1, wherein the route information includes one or more of projected mobile asset location information, projected fuel usage information, projected engine speed information, projected engine load information, projected engine emission information, or fuel station location information for one or more fuel stations along the route, and wherein fuel combustion ratio is further selected based on mobile asset operation information including one or more of actual engine speed information, actual engine load information, actual engine emission information, or actual mobile asset location information.

5. The method of claim 1, wherein the fuel combustion ratio is a ratio of the first fuel and the second fuel to be delivered to the at least one cylinder of the engine, and wherein the fuel combustion ratio is further selected based upon mobile asset operation information including one or more of a quantity of at least one of the first or second fuels present in respective mobile asset fuel sources or actual fuel usage information.

6. The method of claim 5, wherein selecting the fuel combustion ratio further based upon the mobile asset operation information comprises determining a predicted first amount of the first fuel and a predicted second amount of the second fuel based at least in part on projected fuel usage information and adjusting the predicted first amount of the first fuel and the predicted second amount of the second fuel based on one or more of actual fuel usage information, actual engine speed information, actual engine load information, actual engine emission information, or actual mobile asset location information.

7. The method of claim 1, further comprising supplying an engine exhaust with a third amount of the first fuel so that the actual emission level associated with usage of the first and second fuels is less than or equal to the determined emission level.

8. The method of claim 1, further comprising selecting, from a plurality of fuel stations along the route, a particular fuel station for refueling the mobile asset with at least one of the first or second fuels based upon the route information so that the projected exhaustion of the first fuel does not precede the projected exhaustion of the second fuel.

9. The method of claim 1, wherein the first amount and the second amount are further selected so that the projected exhaustion of a particular fuel selected from the first fuel and the second fuel does not precede projected arrival of the mobile asset at a location where the mobile asset may be resupplied with that particular fuel.

* * * * *